INVENTORS
IRA C. MAXWELL
OLE H. LANGEN
BY PETER W. TONGEN
Paul, Moore & Rugger
ATTORNEYS

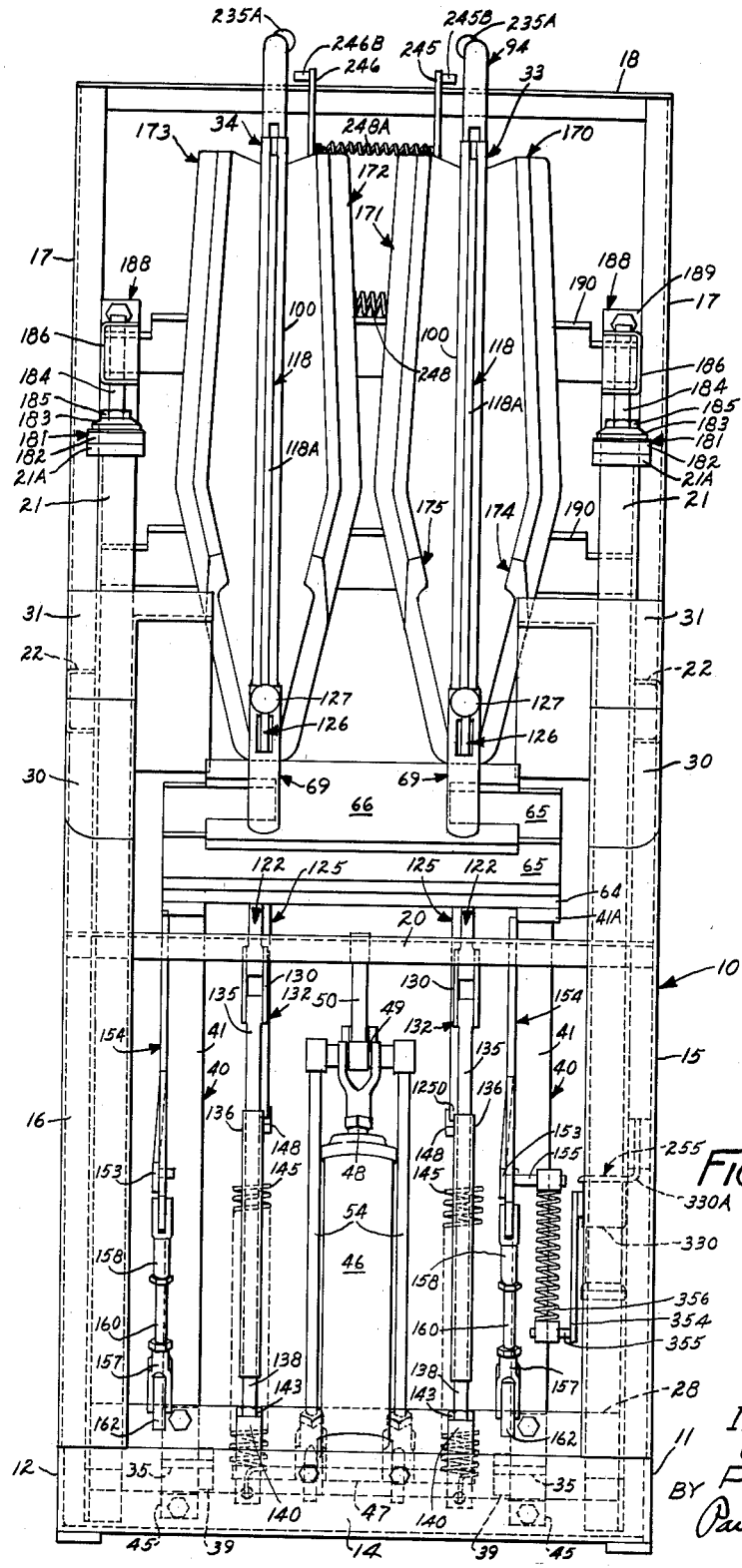

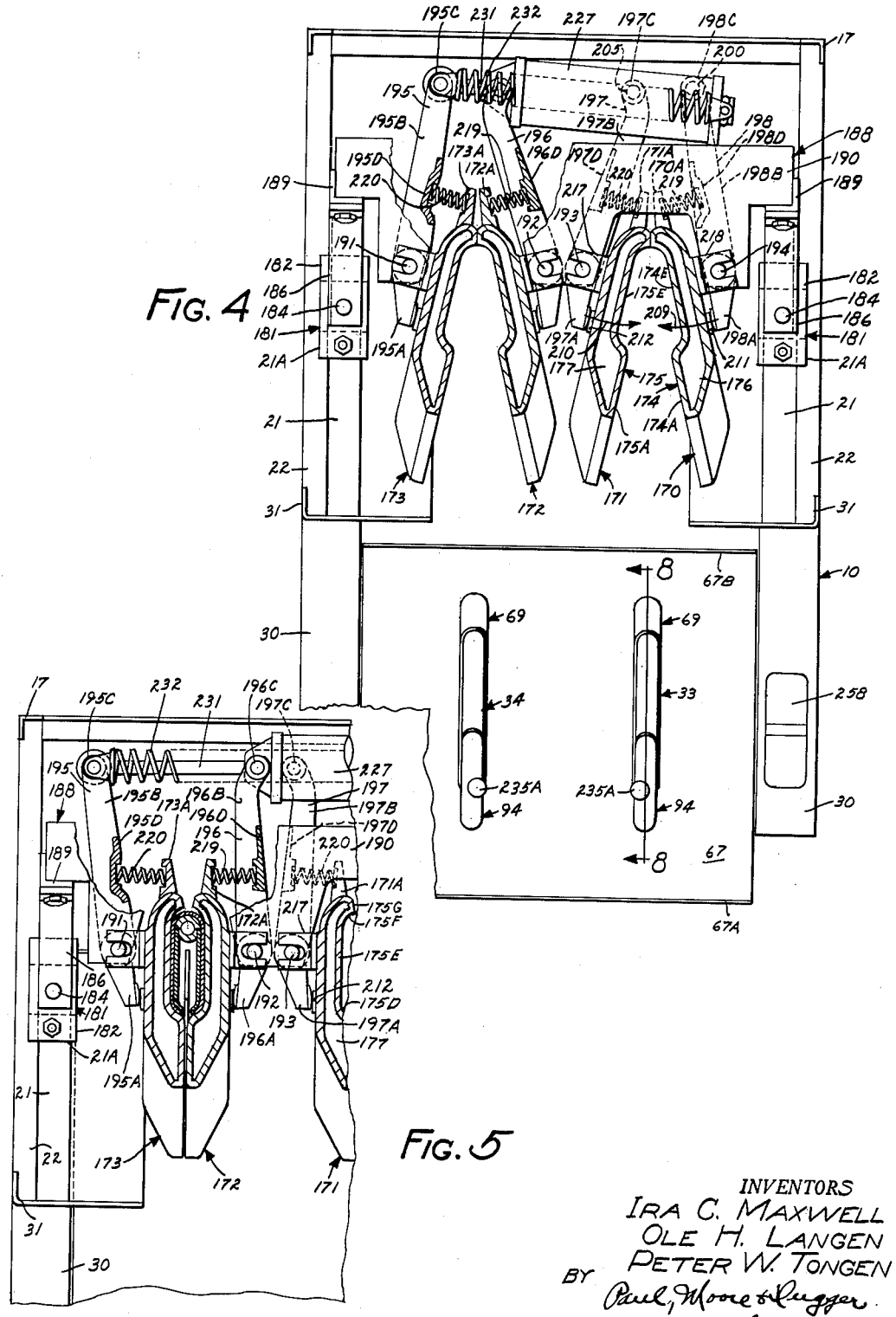

Jan. 3, 1956 I. C. MAXWELL ET AL 2,729,370
PRESSING MACHINE
Filed Sept. 2, 1952 13 Sheets-Sheet 5
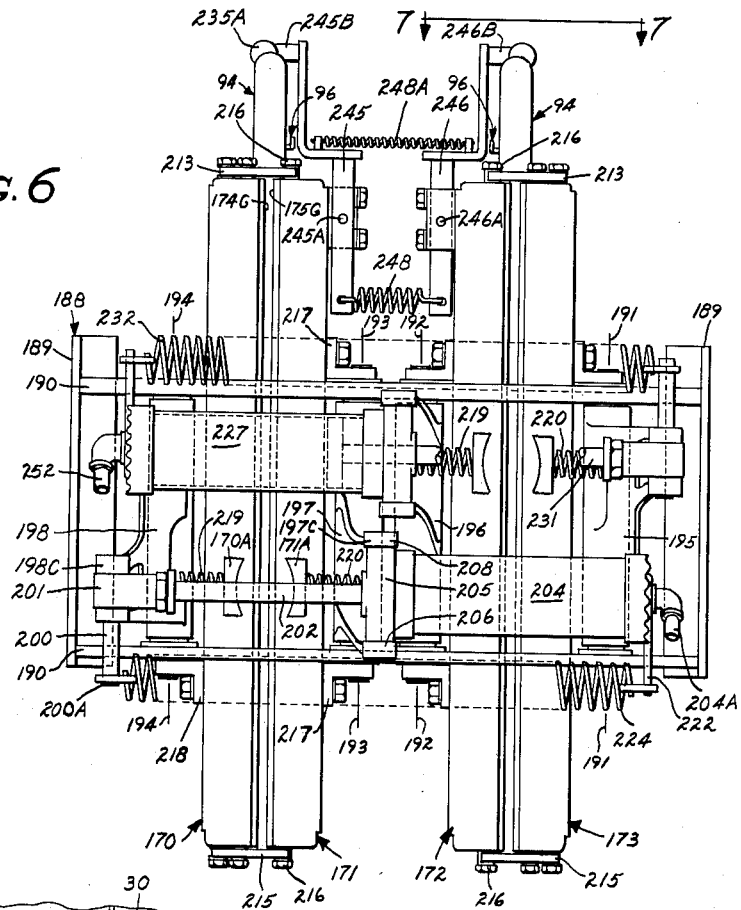
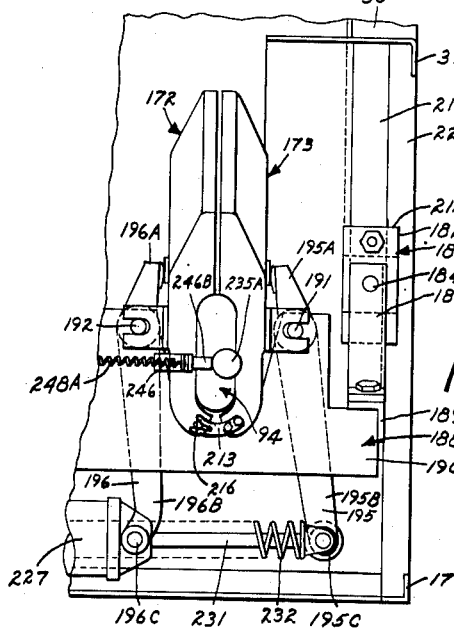
INVENTORS
IRA C. MAXWELL
OLE H. LANGEN
PETER W. TONGEN
BY
ATTORNEYS

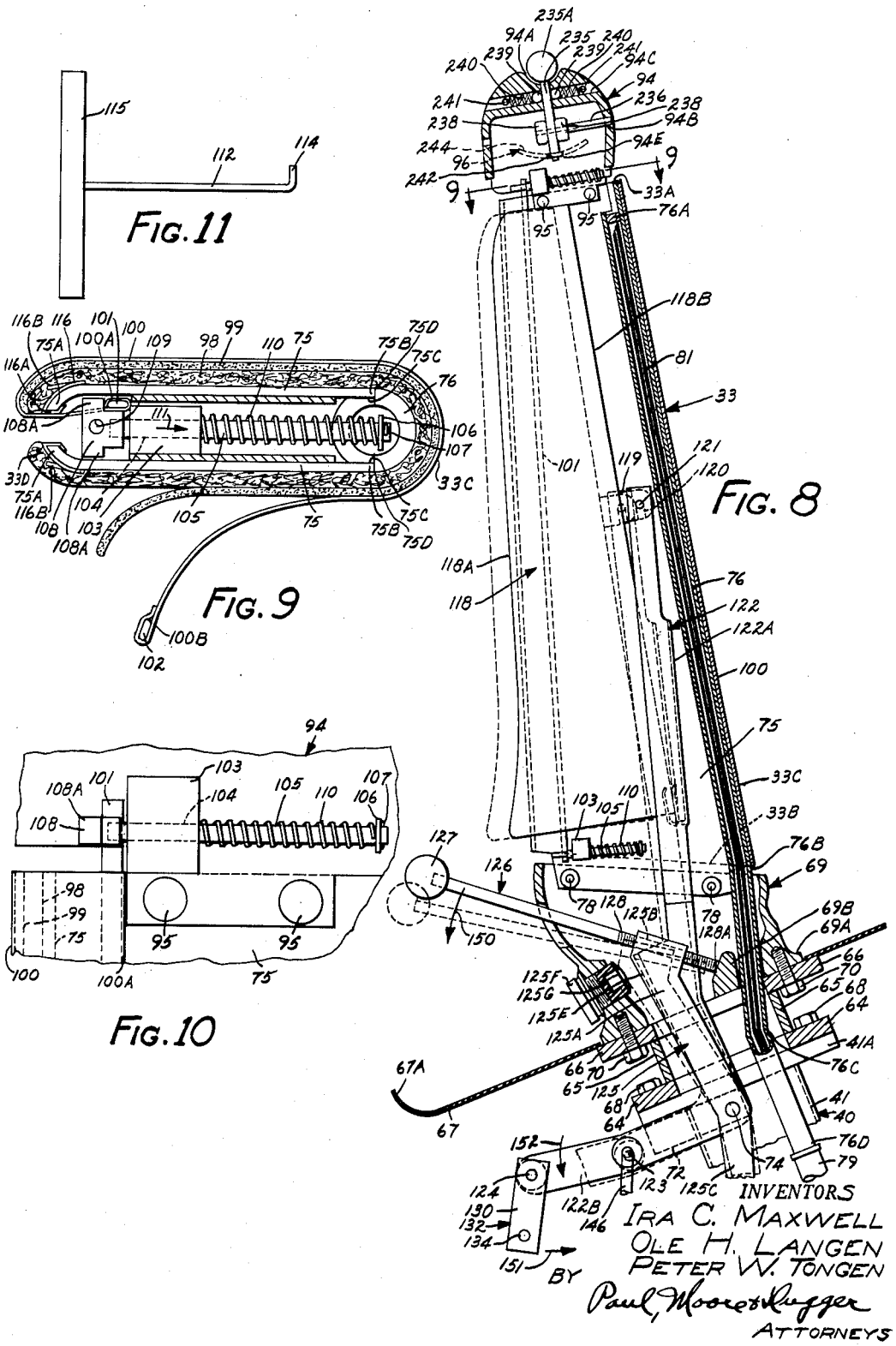

Jan. 3, 1956     I. C. MAXWELL ET AL     2,729,370
PRESSING MACHINE

Filed Sept. 2, 1952     13 Sheets-Sheet 7

INVENTORS
IRA C. MAXWELL
OLE H. LANGEN
PETER W. TONGEN
BY Paul, Moore & Lugger
ATTORNEYS

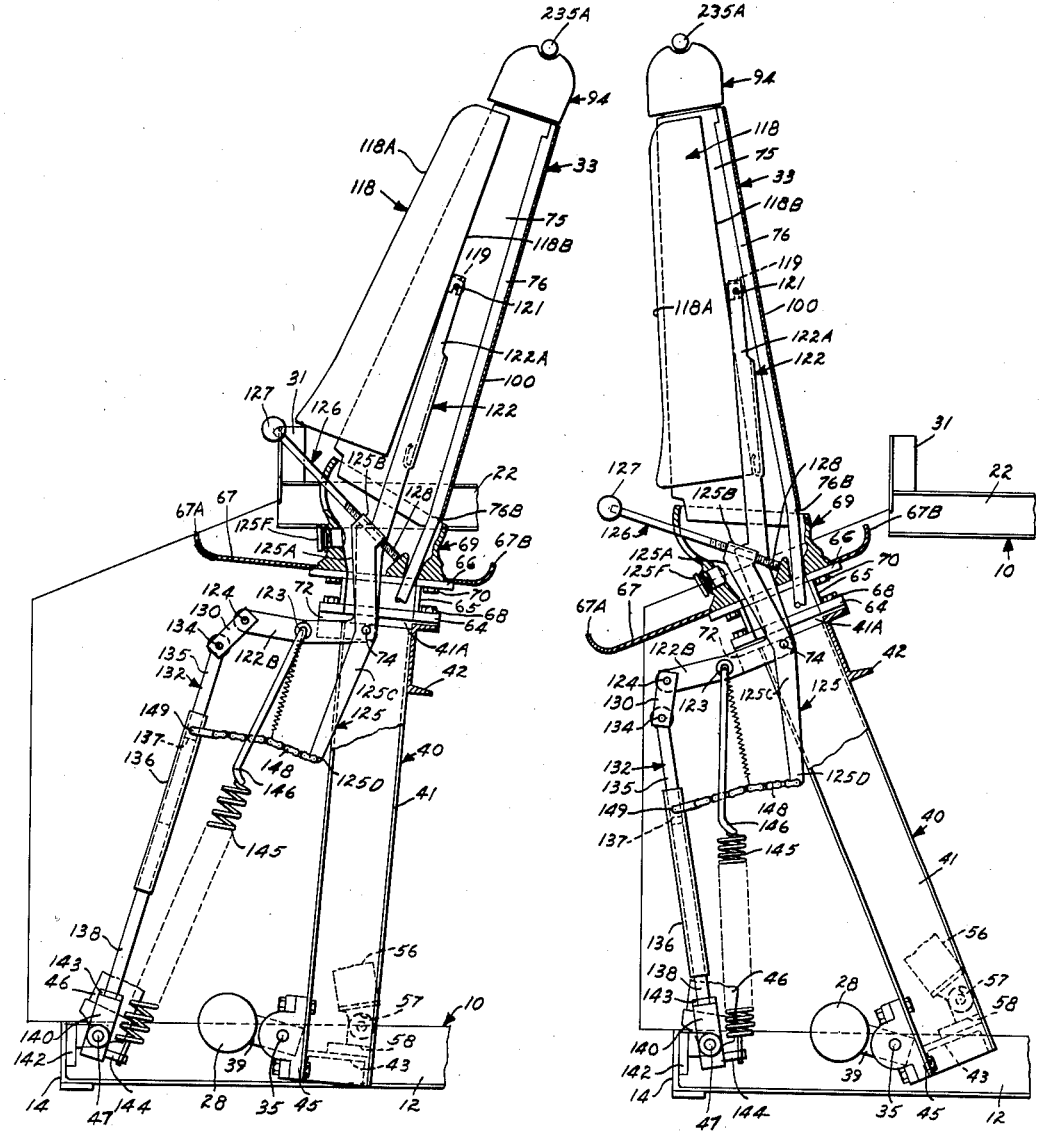

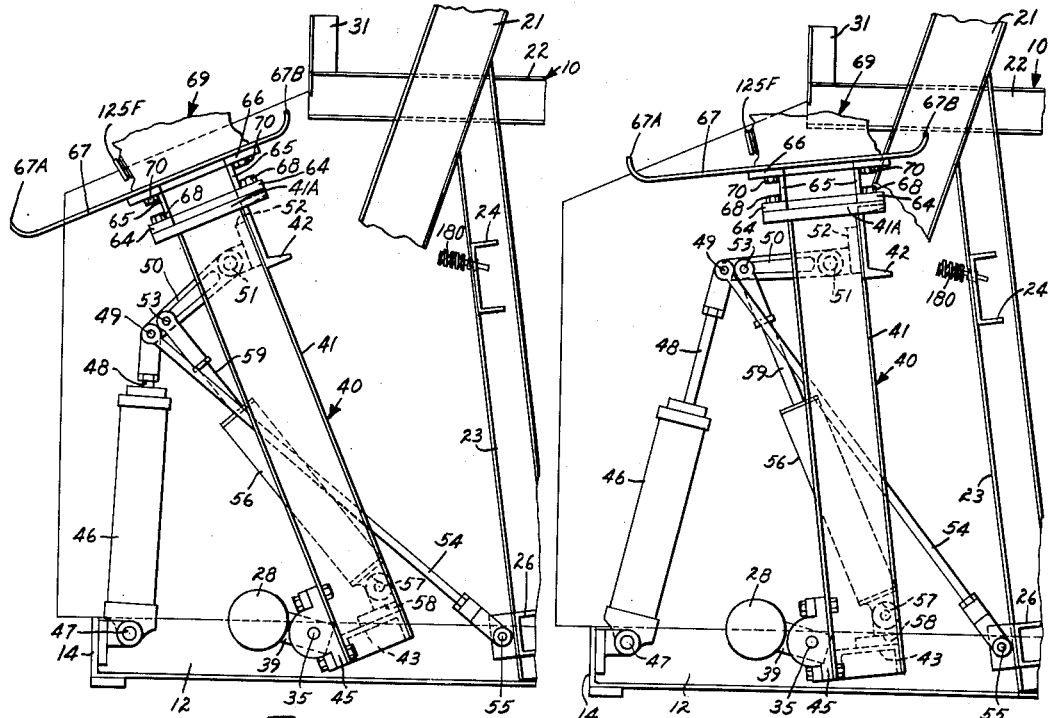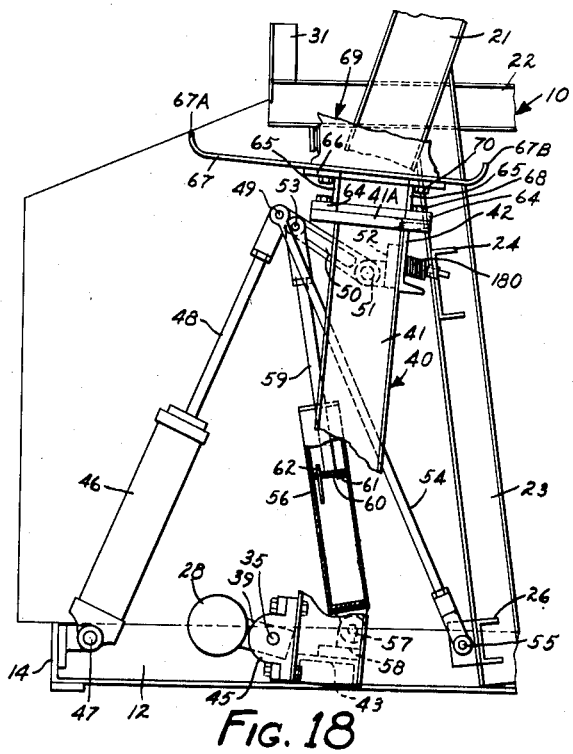

INVENTORS
IRA C. MAXWELL
OLE H. LANGEN
PETER W. TONGEN
BY Paul, Moore & Dugger
ATTORNEYS Jan. 3, 1956   I. C. MAXWELL ET AL   2,729,370
PRESSING MACHINE
Filed Sept. 2, 1952   13 Sheets-Sheet 11

INVENTORS
IRA C. MAXWELL
OLE H. LANGEN
PETER W. TONGEN
BY Paul, Moore&Dugger
ATTORNEYS Jan. 3, 1956     I. C. MAXWELL ET AL     2,729,370
PRESSING MACHINE
Filed Sept. 2, 1952     13 Sheets-Sheet 12

INVENTORS
IRA C. MAXWELL
OLE H. LANGEN
PETER W. TONGEN
BY Paul, Moore&Lugger
ATTORNEYS

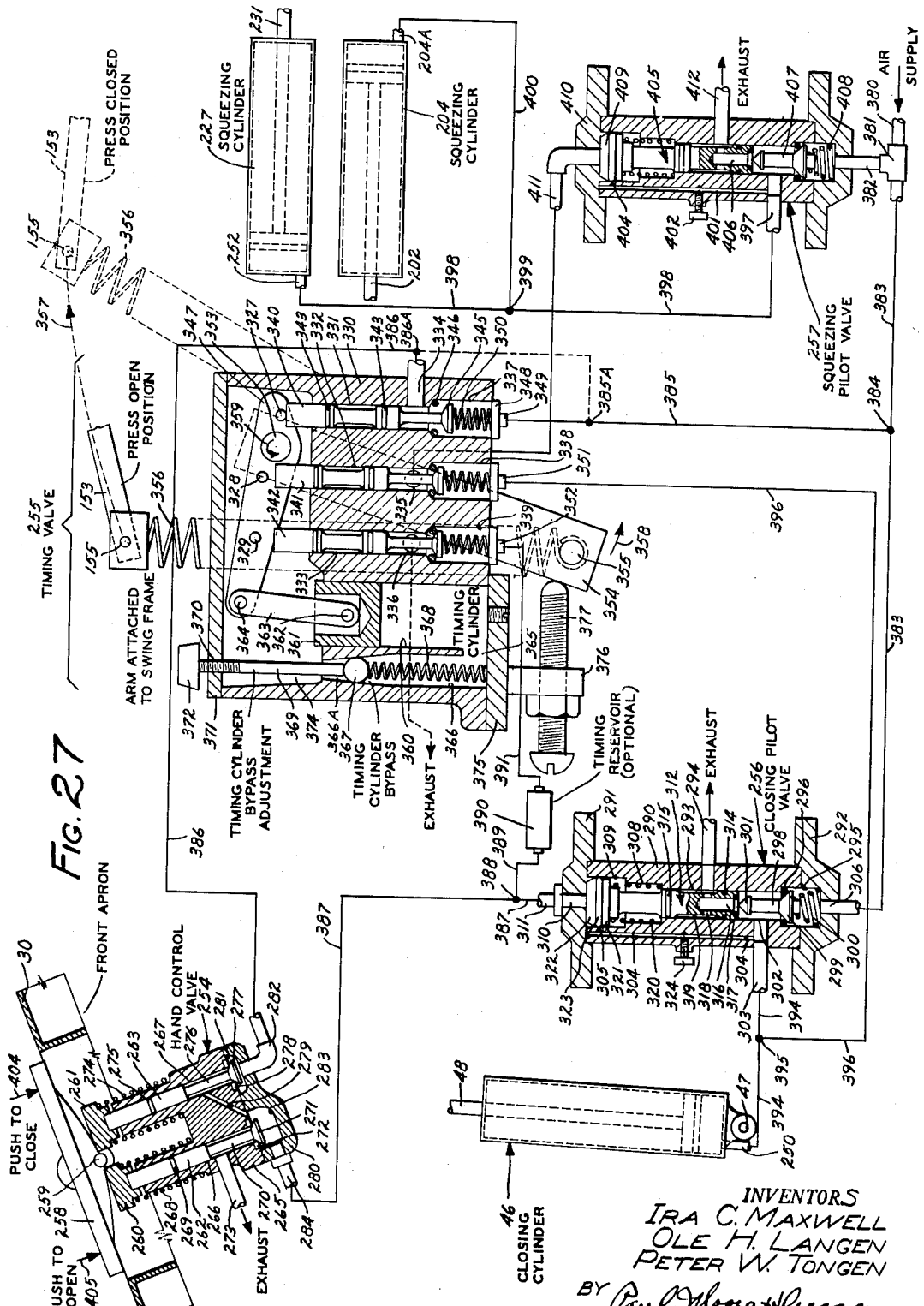

United States Patent Office 2,729,370
Patented Jan. 3, 1956

2,729,370

PRESSING MACHINE

Ira C. Maxwell, Ole H. Langen, and Peter W. Tongen, Minneapolis, Minn., assignors to The Unipress Company, Incorporated, Minneapolis, Minn., a corporation of Minnesota Application September 2, 1952, Serial No. 307,456

29 Claims. (Cl. 223—73)

This invention relates to power driven pressing machines for the purpose of pressing tubular sections of garments such as sleeves, pant legs and the like. Apparatus of this character has its principal application in the pressing of the sleeves of shirts, hospital coats, jackets and the like. Heretofore the pressing of garment sleeves has been accomplished by sleeving the tubular section desired to be pressed on a slender form or "buck" whereupon a longitudinal portion of the tubular section was then pressed by bringing a presser head down smartly against the buck. The presser head was then manually released and the tubular section loosened from the buck and rotated about its longitudinal axis so as to bring a fresh and unpressed area of the garment over the buck, and the operation repeated as many times as was necessary to complete pressing all around the tubular section. The pressing function was thus accomplished in two or more lays of the tubular section on the buck. In some instances, machines have been suggested the object of which was to press the tubular section such as a sleeve in one lay of the garment. To accomplish this it had been the usual practice to sleeve the tubular section onto a form of spatulate character, provision usually being made for expanding the spatulate form for the purpose of taking up slack in the tubular configuration so as to produce a comparatively uniform pressing effect over most of the tubular area of the garment. Early presses of this character have left much to be desired in that they are complicated, heavy and difficult to use. A primary difficulty of such presses of the prior art was due to the fact the spatulate form, regardless of how thin it was made, upon which the tubular garment section was "sleeved," when pressed between pressing platens, always left a narrow longitudinal area which was unpressed due to the fact that the platens or "pressing heads" could never be made completely to fit the edges of the spatulate form. This difficulty in the prior art was substantially eliminated by the invention set forth in the copending application of Maxwell, Langen and Plehal Serial No. 145,258, filed February 20, 1950, now Patent No. 2,687,241 issued August 24, 1954. Many pressing machines made in accordance with the invention of said application have been built and are in use. The present invention is an improvement on the pressing machines of said application.

It is an object of the present invention to provide improvements for the garment presses and particularly to provide improved garment presses for the pressing of tubular garment sections, particularly sleeves.

It is an object of the present invention to provide an improved pressing machine wherein a sleeve or other tubular garment section may be pressed in a single lay and only a minimum amount of area of the sleeve left out of contact with the presser head.

It is a further object of the invention to provide an improved pressing machine for pressing a tubular garment section in one lay by means of a combination of pressing actions of a form with reference to presser heads that are movable by compound motions.

It is a further object of the invention to provide an improved pressing machine for pressing tubular garment sections in one lay wherein pressing action is accomplished by a plurality of motions taken together, and to provide operator controlled means for initiating such pressing motions whereafter the machine completes the pressing action in an automatic sequence of steps in proper timed relationship.

It is a further object of the invention to provide an improved pressing machine for the pressing of tubular garment sections wherein the presser heads move into and out of engagement with opposite faces of the spatulate form upon which the tubular section is placed for pressing and wherein the presser heads are mounted so as to be free for movement toward and away from said form and also about an axis transverse to the form, so as thereby to allow for slight irregularities, deflection, warping and motion of the cooperating pressing elements of the machine.

It is a further object of the invention to provide an improved one lay sleeve press of automatic character and of less bulky design than heretofore available.

It is another object of the invention to provide an improved one lay sleeve press wherein all pressing actions of the press are carried out automatically when once initiated by the operator.

It is a further object of the invention to provide an improved one lay sleeve press having a relatively short front to back dimension and relatively narrow.

It is another object of the invention to provide an improved one lay sleeve press having a work table and guard of improved form, appropriately positioned and mounted for movement with the forms on which the tubular sections of the garment are sleeved.

It is a further object of the invention to provide in an improved sleeve press improved heating circuits for supplying heat to the bucks on which the tubular garment sections are sleeved, thereby enabling rapid elimination of moisture from the garments during the pressing operation and drying of the buck padding.

It is a further object of the invention to provide, in an improved one lay pressing machine, an improved form upon which the tubular garment sections may be sleeved for the pressing operation.

It is a further object of the invention to provide an improved buck for a one lay sleeve press.

Other and further objects of the invention are those inherent in the apparatus herein illustrated, described and claimed.

The invention is illustrated with reference to the drawings in which corresponding numerals refer to the same parts, and in which Figure 1 is a side elevational view of the mechanism of the press shown with the exterior cover of the pressing machine removed, and the press in the "open" position, this view being partly in section;

Figure 3 is a front elevational view showing the machine in the "open" position;

Figure 1:
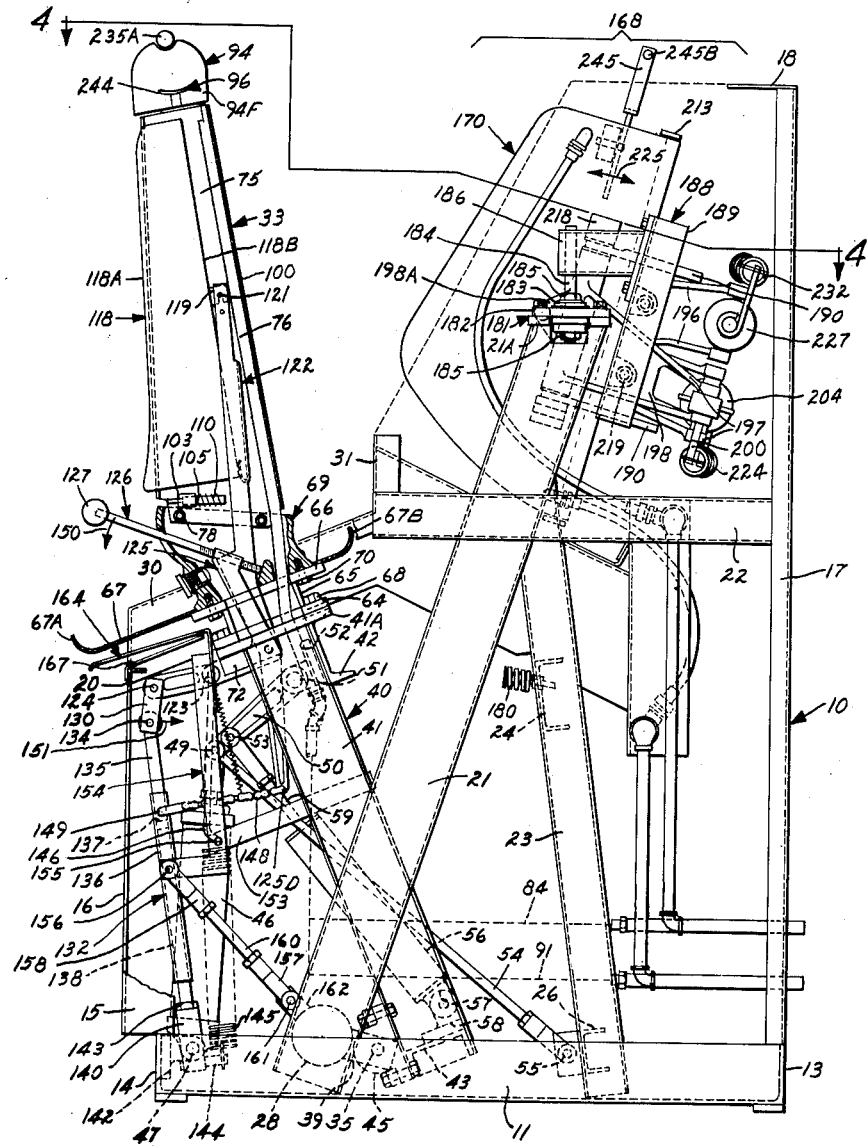
Figure 2:
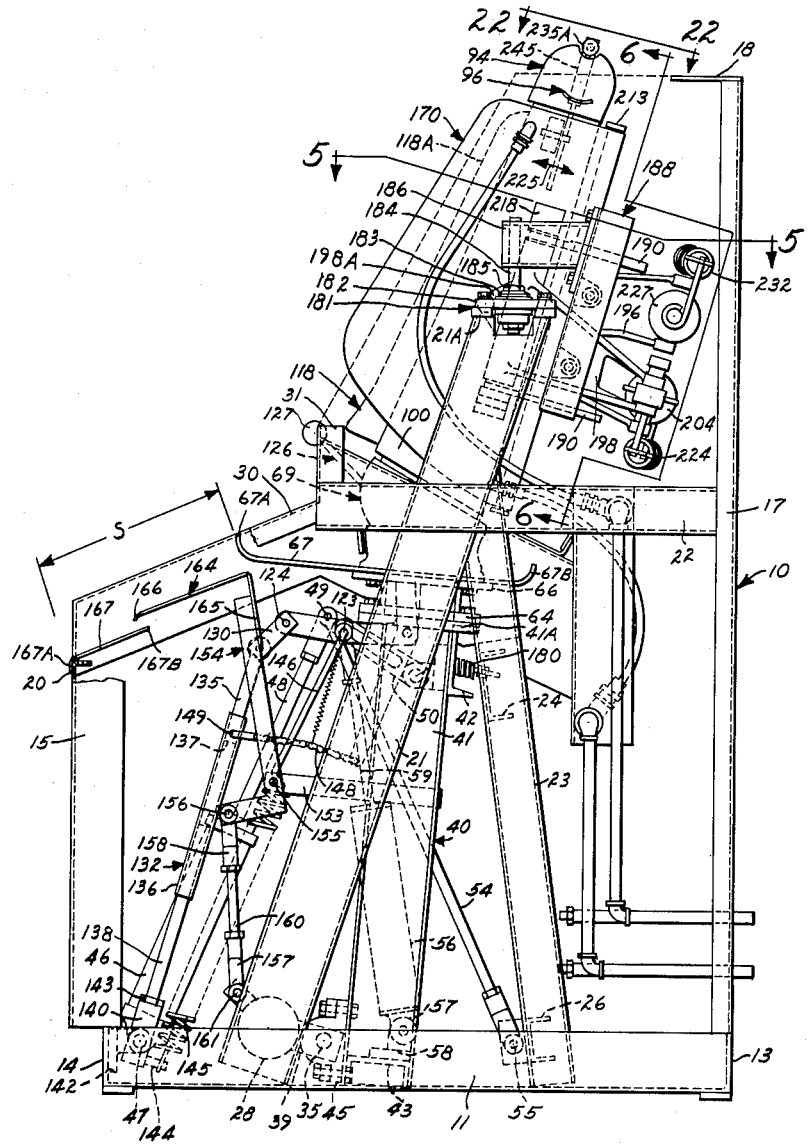
Figure 2 is a side elevational view corresponding to Figure 1, except that it shows the press in the closed or "pressing" (squeezing) position.
Figure 12:
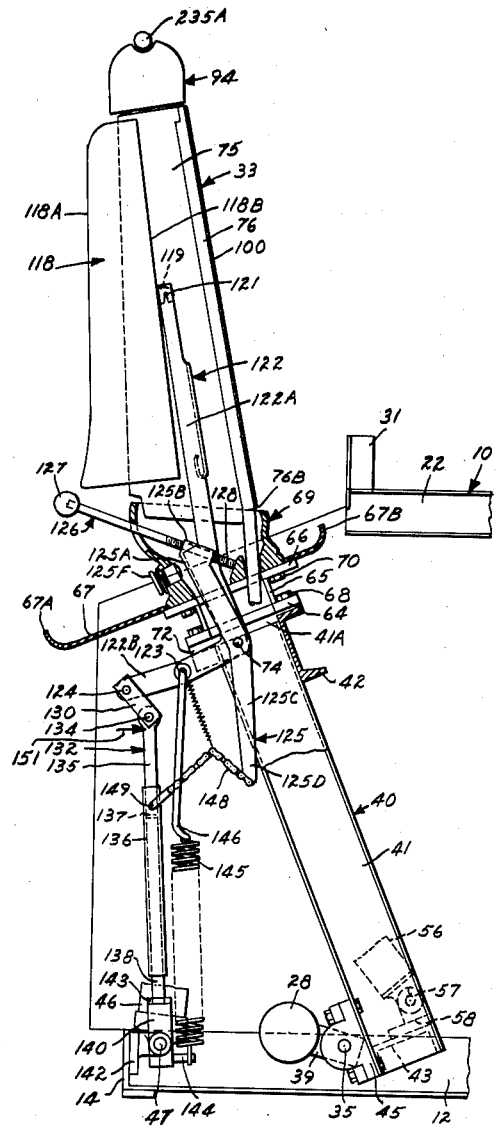

Figure 4 is a horizontal sectional view showing part of the machine in plan view, and part in section, the sectioned portion being taken along the line and in the direction of arrows 4—4 of Figure 1, the press being shown in the "open" position Figure 5 is a fragmentary horizontal sectional view corresponding to that shown in Figure 4 except that it shows the press in the "closed" position, the sectioned portion of this view being taken along the line and in the direction of arrows 5—5 of Figure 2;

Figure 6 is a fragmentary rear elevational view of the press shown in the "closed" position, this view being taken along the line and in the direction of arrows 6—6 of Figure 2;

Figure 7 is a fragmentary plan view taken along the line and in the direction of arrows 7—7 of Figure 6;

Figure 8 is a vertical sectional view of one of the garment tube bucks, this view being taken along the line and in the direction of arrows 8—8 of Figure 4;

Figure 9 is an enlarged horizontal sectional view through the buck structure. This is taken at the level and in the direction of arrows 9—9, Figure 8, with the exception that it shows the buck cover loosened at one side and partially folded back and the next layer of buck padding on the same side also partially folded back, illustrating the layers of cover, padding, etc. of the buck.

Figure 19:
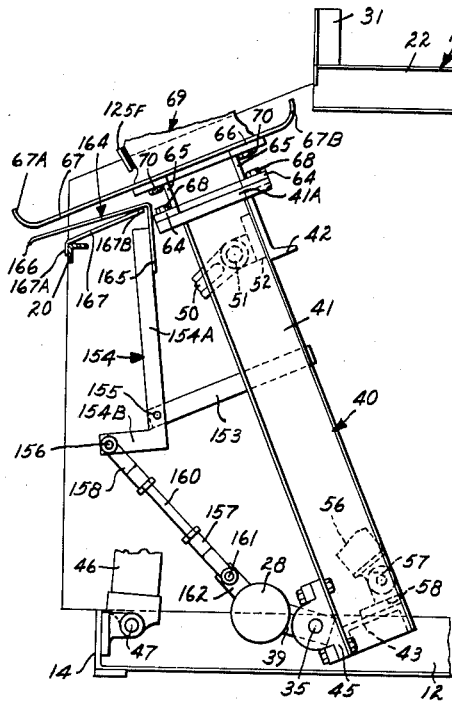
Figure 20:
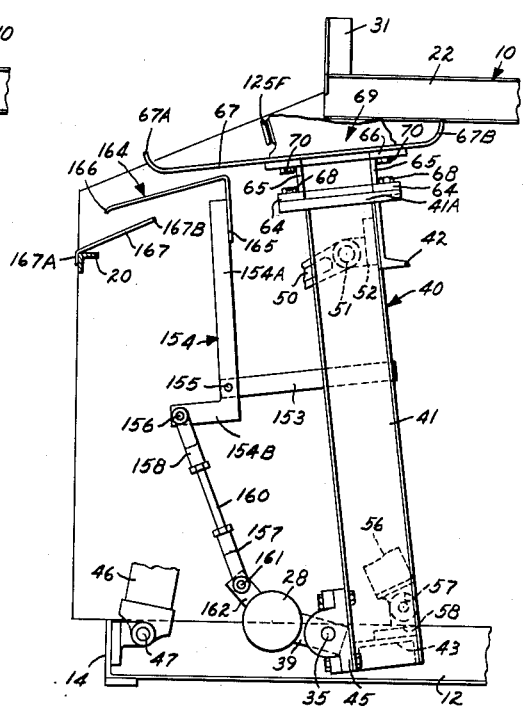
Figure 21:
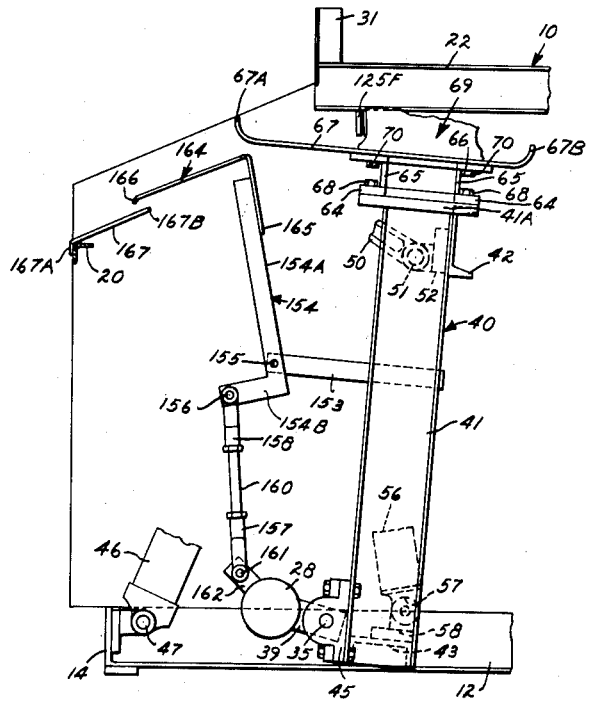

Figure 10 is a fragmentary vertical elevational view, somewhat enlarged; and it shows in detail the upper buck cover holder, by means of which the buck cover is held taut;

Figure 11 is a view of a key by means of which the buck cover holder of Figure 9 may be manipulated as during installing and replacing the buck cover;

Figures 12, 13 14 and 15 are a series of related views, illustrating the buck wing operating mechanism. Each of these views is a fragmentary side elevation from the right-hand side of the machine, corresponding to Figure 1, and certain of the parts are removed so as more clearly to illustrate the manner in which the buck wing is manipulated (manually and automatically) during the pressing operation;

Figures 16, 17 and 18 are likewise a series of related fragmentary side elevational views from the same (right-hand) side of the machine as Figures 12–15 and show certain of the parts removed. These views illustrate the air cylinder mechanism, linkages and hydraulic check by means of which the bucks are swung to and from the pressing position at controlled velocities;

Figures 19, 20 and 21 are likewise a series of related fragmentary side elevational views with certain of the parts removed illustrating how the table and guard mechanism are operated as the bucks are swung from loading position to pressing position. These views are fragmentary side elevational views taken from the same (right-hand) side of the machine as for Figures 12–18;

It will be understood that the machine has in it all of the sets of mechanisms and linkages shown in all of these Figures 12–21, but for clarity of illustration, in each of these three sets of figures the showing is fragmentary and limited to only the linkages, etc. that are required for the particular operation, viz. buck wing control in Figures 12–15; buck swinging mechanism in Figures 16–18 and table and guard in Figures 19–21. In Figures 1 and 2 all of the mechanisms are shown.

Figure 22:
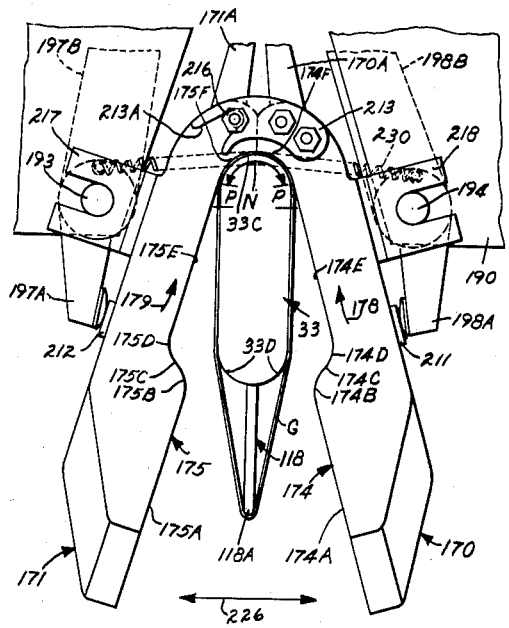
Figure 23:
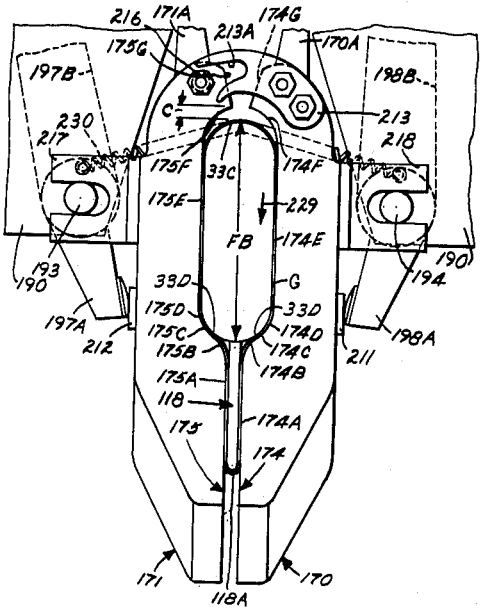

Figure 22 is a fragmentary top plan view somewhat like the showings of Figures 5 and 7, Figure 22 being taken along the line and in the direction of arrows 22—22 of Figure 2, but Figure 22 shows the buck in its preliminary pressing position and before the presser heads have been brought into engagement with the sides of the buck for the final pressing operation;

Figure 23 corresponds to Figure 22 but shows the buck after the presser heads have been moved into engagement with the flat sides of the buck for the final pressing operation.

Figure 24:
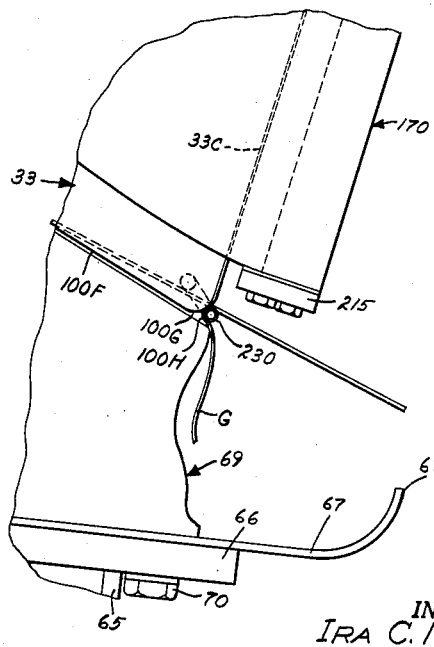

Figure 24 is a fragmentary side elevational view (certain of the parts removed for clarity) showing the lower rear edge of the presser heads while engaged with the buck, and illustrating the manner in which the portion of the sleeve adjacent the shoulder area is held during the pressing sequence and as the presser heads are opened.

Figures 25, 26:
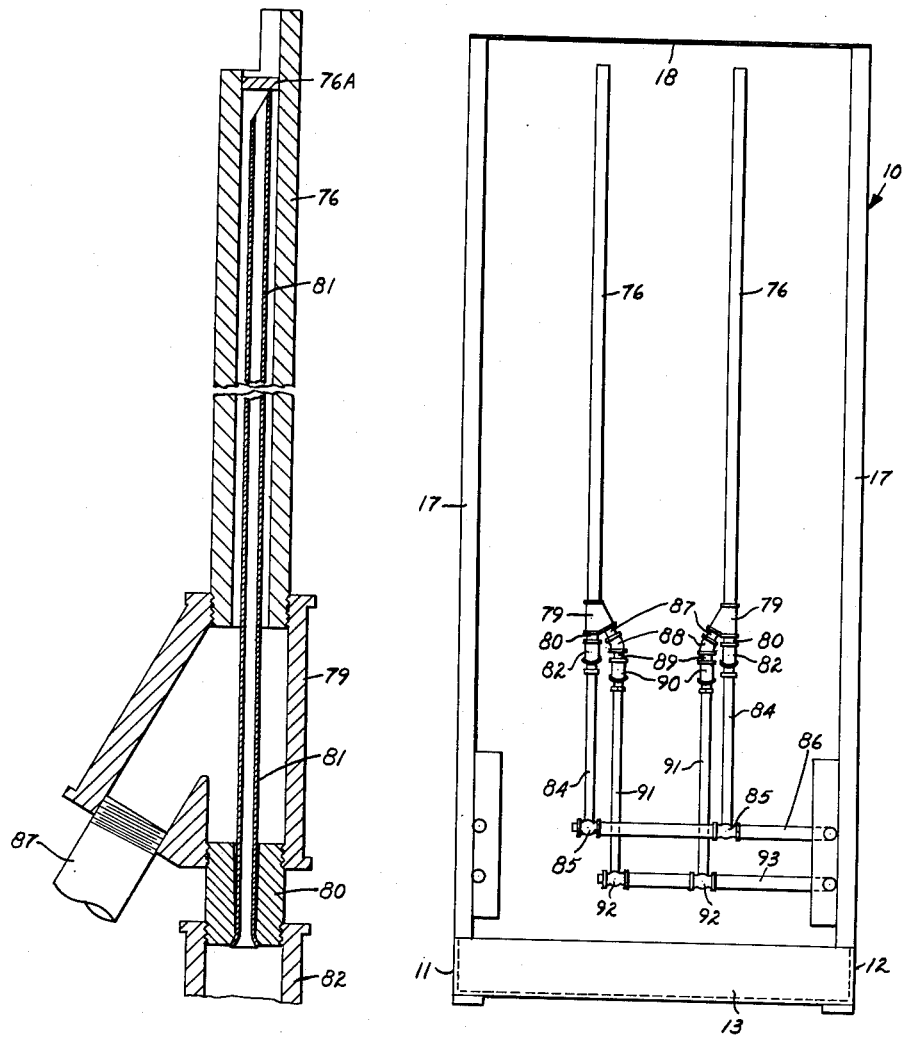

Figure 25 is a fragmentary rear elevation with certain of the parts removed for clarity, of the pressing machine, showing the steam heating pipes for the buck with steam and condensate connections;

Figure 26 is an enlarged vertical sectional view through one of the buck heating pipes of Figure 25;

Figure 27 is a schematic view, partly in section and partly diagrammatic, showing the compressed air circuit for the operation of the machine.

*General assembly.*—Referring to the drawings, particularly to Figures 1, 2 and 3, the pressing machine includes a frame generally designated 10 having floor sill members 11 and 12 at the right and left sides thereof respectively connected by the rear cross frame member 13 and a front cross frame member 14. At the front of the machine there are sturdy corner posts 15 and 16. At the rear of the machine is a right rear post 17 and a corresponding left rear post. The rear posts extend upwardly to the top of the machine and are connected together by cross frame member 18. Likewise the front posts 15 and 16 are connected together by a cross frame member 20. Extending upwardly at an angle from the floor sills 11 and 12 are a pair of angle frame members 21 at each side of the machine. These angle frame members extend up above an intermediate horizontal frame member 22 at each side of the machine. A brace 23 at each side of the machine extends from the floor sills 11 or 12, as the case may be, up to one of the intermediate horizontal frame members 22, the entire frame being solidly welded together. To the braces 23 there is attached a cross frame member 24 which serves to give the frame lateral stability and another sturdy channeled cross frame member is provided at 26.

Adjacent the point of attachment of the angle frame members 21 with the floor sills 11 or 12, there is provided a tubular cross frame member 28. It is preferred that the front posts 15 and 16 shall be made of smoothly curved steel so as to provide a nice finish and the entire frame which is sturdily welded together, is provided in the finished machine with exterior panels which completely house the mechanism, except for those parts which must swing free. Thus, frame members 30 extend from the tops of the posts 15 and 16 up to the intermediate horizontal frame members 22 and at their junction there are provided posts at 31 which serve as supports for certain of the panels.

Referring to Figures 1 and 3 the machine includes a pair of spatulate bucks generally designated 33 and 34. The bucks 33 and 34 are mounted parallel to each other for swinging movement about a pivot 35 from the position shown in Figure 1 to the position shown in Figure 2. Figure 1 is the loading position in which the tubular garment members, such as pairs of sleeves of a shirt are "sleeved" onto the spatulate bucks 33 and 34.

It will be understood with reference to the present specification and claims that the bucks and heads of the press have a shape suitable for the pressing of shirt sleeves, although it will be appreciated that they may be changed in shape for the pressing of coat sleeves, such as the sleeves of duck jackets, waiters' coats, hospital coats, and many other garments of like or similar kind which in their use are regularly laundered. Also, the bucks and heads may by appropriate modification in shape be utilized for pressing other tubular garment members, such as pant legs. Therefore, throughout this specification and claims where the terms "shirt" or "shirt sleeves" are used, it will be understood merely to be exemplary of the garments and garment elements capable of being pressed by the invention and that no limitation is thereby imposed upon the invention.

When in this Figure 2 position, a wing is extended from the spatulate bucks, as more completely described hereinafter. This serves to draw the tubular garment members taut. Thereupon, the spatulate forms are both moved by a swinging motion from the position shown in Figure 1 to the position shown in Figure 2 where they each are pressed between separated pairs of presser heads generally designated 170—171 and 172—173. These presser heads are first in an "open" position, such as shown in Figure 22, and in this position a longitudinal portion of the garment tube form is pressed. Thereupon, by automatic operation of the machine the respective members of each pair of presser heads move toward the other members of the presser heads and into engagement with the flat sides of their cooperating spatulate bucks, thereby completing the pressing operation. Then, after an automatically timed interval, the pairs of presser heads open and the spatulate bucks return from the Figure 2 position to the Figure 1 position. The mechanism by which the swinging movement of the presser bucks is accomplished, will now be described.

Referring to Figures 1, 2, 3 and to Figures 16, 17 and 18 it will be observed that extending to the rear and slightly downward from the tubular cross frame member 28 of the frame, there are ears that are provided mounting lugs 39 upon which pivot 35 is held. The pivot 35 serves as a mounting for a swinging frame generally designated 40 having a pair of frame legs 41—41 extending up and down at each side and a top cross frame member 42 and a bottom cross frame member 43. The frame legs and cross frame members top and bottom are preferably made of sturdy channel iron.

At the bottom of each one of the frame legs 41 there is a pillow block bearing generally designated 45 which journals upon the pivots 35, thereby permitting the entire frame 40 to swing about the pivot 35 as a center. The entire spatulate buck form and mechanism connected with it is mounted upon the swinging frame.

The mechanism for swinging the frame from the position shown in Figure 1 to the position shown in Figure 2 and vice versa is illustrated best in Figures 16 through 18. This mechanism comprises an air cylinder 46, the cylinder being pivoted at 47 on a bracket mounted upon the front cross frame member 14. The piston rod 48 of the cylinder has a pivotal end connection at 49 which is connected by the link 50 to a pivot 51 carried by the bracket 52 mounted upon the top cross frame member 42 of the swinging frame 40. The pivot 49 also has connected to it a pair of radius rods 54 which have their lower ends pivotally connected at 55 upon brackets mounted upon the bottom cross frame member 26. The radius rods 54 accordingly determine the path of movement of the pivot 49 as an arcuate path about the pivot 55 as the center. By properly selecting the lengths of the radius rods 54, the link 50 in relation to the distance between pivot 35 of the frame 40 and pivot 51 of the link 50, the motion of the piston rod 48 of cylinder 46 may be utilized for accomplishing a rapid swinging movement of the spataulate bucks 33—34 toward the heads 170—171 and 172—173, followed by a firm squeezing action of the bucks edgewise against the heads in the open position of Figure 22, for ironing the narrow longitudinal area by the dimension P—P in Figure 22.

Thus, during the early portion of movement of piston rod 48, its motion is transmitted directly to the pivot 51 for producing thus a more rapid movement of the frame 40 and spatulate form thereon, whereas during the latter part of the movement as exemplified by Figure 2, the movement of the piston 48 is transmitted through the link 50, controlled by the radius rods 54, is at a proportionately less rapid rate but greater pressure is exerted. Accordingly, a quick free-swinging movement of the spatulate bucks towards the heads is accomplished but adequate pressure for ironing the longitudinal area N is obtained at the end of such swinging movement.

At 56 there is illustrated a hydraulic shock absorber in the form of a cylinder pivoted at 57 upon the bracket 58 carried by the bottom cross frame member 43 of the frame 40. The piston rod 59 of the hydraulic shock absorber is pivoted upon the pivot 53. The shock absorber piston rod 59 carries a piston head at 60 having a flap check valve 61 and a metering rod valve 62. The check valve 61 is set so that the hydraulic shock absorber, piston rod 59, is permitted to move freely in the upward direction (Fig. 18) as the press moves from the Figure 1 to the Figure 2 position, thus not impeding the closing movement of the presser heads against the bucks. However, as the press begins to open, the flap valve 61 closes and in such a case the metering rod 62, which is shaped along its length and hence controls the orifice through the piston 60, accordingly controls the flow of oil from one side to the other side of the piston. The metering valve is shaped so that the piston 60 is permitted to move rapidly from the position shown in Figure 2 towards the position shown in Figure 1 but as the spatulate bucks mounted upon the frame 40 come into proximity to the Figure 1 position, the metering rod 62 pinches off the orifice through the piston 60 and checks the movement of piston 60, thereby bringing the swing frame 40 and the spatulate bucks to a controlled smooth stop at the Figure 1 position.

At the upper ends of each of the side legs 41 of the frame 40 there is a mounting plate 41A extending across the swing frame 40 parallel to the top cross frame member 42 are the flanges 64—64 of angle members, the opposite flanges 65 of which likewise extend across the frame. These angles are welded up so as to provide adequate strength, and to the flanges 65—65 are mounted the plate 66 which serves as the immediate mounting point for the base casting 69 of each of the bucks. The flanges 64—64 are held in place by the cap screws 68 and the base casting 69 is held in place upon the plate 66 by cap screws 70. The plate 66 also serves as a mounting for the table 67 which stretches straight across the press beneath each of the upstanding spatulate bucks 33 and 34. Beneath the front flange 64, Figure 8, there is a downwardly and inwardly extending pair of lugs at 72 beneath the opening in each of the base castings 69 which serves as a mounting for the pivot 74, for a purpose presently to be described.

The base casting 69 of the spatulate buck has a flange at 69A and is hollow inside except for an angularly disposed web 69B which connects the sidewalls of 69. It is to this base casting 69 that the plates 75 of the spatulate form are attached by pins 78. Referring to Figure 9 these metal pieces 75—75 are generally flat but are curved towards each other at their front edges 75A—75A. The rear edges 75B—75B of these plates are welded into longitudinal grooves at 75C—75C that are milled in a heavy walled steel tube 76. The attachment of the edges 75B to the steel tube 76 may be by welding, by cover brazing or other suitable fastening means, the only essential being that the fastening be mechanically strong and capable of ready transmission of heat from the tube 76 to the plates 75.

The plates 75 are attached to the base casting by means of pins 78—78 and the plates 75 accordingly serve as a support for the tube or pipe 76. The pipe 76 is plugged at its upper end 76A and its lower end, adjacent the lower edge of the plate 75, is bent at 76B so as to extend down through the hollow base casting 69, through the hole back of web 69B therein. The pipe 76 is again bent at 76C so as to extend down between the flanges 64—64 as at 76D, Figure 8, so as to permit steam and condensate water connections to be made thereto, as shown in Figures 25 and 26. Referring to these figures it will be noted that each of the pipes 76 extends down to a Y connection at 79. Into one branch of the Y is screwed the nipple 80 which has attached to it a smaller diameter tube 81, preferably of copper, which extends all the way up into the pipe 76 and terminates adjacent the plug 76A at the upper end of the pipe 76. To the nipple 80 there is attached a coupling 82 and to it is in turn a flexible steam connection pipe 84 leading to a T 85 and then to steam header 86. To the other branch of the Y 79 there is attached a nipple 87 connected through an elbow at 88 and nipple 89 to a coupling 90 which in turn is attached to one end of the flexible condensate water return line 91 leading to a T 92 in the condensate return line 93. The steam and condensate water connections can be the same for each of the spatulate bucks and are connected in parallel, all as shown in Figure 25. The introduction of the steam at the top of the pipe 76, adjacent the plug 76A insures that a full steam supply is made to the entire interior surface of the pipe 76, and the condensate is returned quickly and efficiently out of the pipe. It was found by lengthy experiments that the heating of the pipe 76 with high pressure steam provides adequate heat for the elimination of water from the buck pads, even at high rates of ironing production and with damp shirts, and it was found also that by having the plates 75—75 welded or otherwise firmly connected to the pipe 76, that the heat is conducted adequately throughout the area of the plate 75 and hence given off to the under surface of the buck pad 98, thereby aiding in the elimination of moisture. The open construction of the base casting 69, and the spacing of the two plates 75 of the buck support, which are likewise open at their upper ends, produces a certain chimney effect, which maintains the interior of the buck free from condensation.

The buck plates 75 are widest at their base and taper to a narrower dimension at their upper ends, so as to conform generally to the shape of shirt sleeves, pants legs, or other tubular garment forms. The upper ends of the two plates 75 are attached together by a top casting 94 which is held in place by the screws 95. The construction of the top casting and of the cuff clamp generally designated 96 is as described in the copending application of Maxwell, Langen and Plehal, Serial No. 145,258 hereinbefore mentioned.

Referring to Figure 9 it will be noted that by milling the groove 75C—75C to approximately the thickness of the plate 75, that a smooth outer surface is thereby produced at the junction of the plate 75 and the tube 76, the edge 75D being easily ground off and polished if desired. Upon the smooth exterior surface thus formed by the two plates 75—75 and the tube 76, there is mounted a suitable buck padding of one or more layers 98 and 99. The pad 98 is preferably made of cloth knitted from rust resistant wire, such as monel metal, stainless steel wire, or the like, the pad being composed of a plurality of plies of such knitted fabric. Upon such resilient woven metallic pad 98 there is preferably laid a pad 99 composed of one or more layers of flannel and over this there is tightly stretched the exterior buck cover 100. Experience has shown that for the severe service encountered in presses of this type, that the buck cover 100 should best be made of very tough fabric, such as nylon fabric.

The attachment of the nylon fabric is accomplished in the following way: The nylon cover has its opposite edges sewed so as to form the headings 100A and 100B into which there are placed thin flat comparatively narrow steel rods 101—102. At the upper and lower ends of the space between the steel side plates 75 there are provided brackets 103 which have holes 104 longitudinally therethrough, which serves as sliding supports for the rods 105. At the rear end of the rods 105 there are washers 106 held in place by the cotter pins 107. To the front ends of each of the rods 105 there is attached a T-shaped head 108 having a hole 109 therein. The spring 110 is pressed between the bracket 103 and the washer 106 and tends to draw the rod 105 back in the direction of arrow 111, as shown in Figure 9. The T-shaped heads 108 have a thickness such that when they are turned so that the head lies parallel with the plate 75, the shoulders 108A—108A will be disengaged from the rods 101 and 102. In order to place the buck cover on the buck padding, the fabric 100 is pulled as tautly as possible by hand over the buck padding, and the two rods 101—102 are then tucked back into the open space between the front edges 75A—75A of the plate 75, thus confining the front edges of the padding.

In Figure 11 there is shown a hook or key which has a long shank 112, a turned over end 114 and a handle 115. The shank 112 is inserted into the space between the front edges of the buck padding and the plates 75 until the hook end 114 can be engaged in the hole 109 of the T-shaped head 108. The head is then drawn forward until it clears the rods 101—102 and is then turned so that the shoulders 108A—108A will engage the rods 101 and 102, respectively. Then the T-shaped head 108 is permitted to be retracted under the influence of spring 110 and this throws a tensioning pressure on the rods 101—102 which accordingly draws the nylon fabric 100 closely and tautly over the buck padding. It will be noted from Figure 9 that over the front edges 75A of each of the buck plates there is a small member generally designated 116 which has a flange 116A also as to embrace the front curved in tip 75A of the plate 75. The member 116 is of light stainless metal and is curved to fit the front bend 75A of the plate 75. However, the curved portion is provided with outwardly punched points at 116B into which the springy knitted metallic buck padding 98 is hooked in the manner that a fabric is hooked on the points of a curtain stretcher. In this way the metallic knitted padding 98 is held from sliding back away from the edge 75A and it frictionally supports the final padding 99.

In the hollow space between the plates 75—75 of the spatulate buck, there is mounted a wing generally designated 118. This wing is of thin sheet metal and is lightly padded and covered with the same nylon fabric that is dressed over its front edge 118A and extends back towards its rear edge 118B. At about mid height along the rear edge of said wing 118 there is a rearwardly extending lug 119 having a downwardly opening slot 120 therein, by means of which the wing may be hooked and hence pivotally suspended upon the pivot 121. Wing 118 is carried by a bell crank lever designated 122 and has an upper crank arm 122A and a lower crank arm 122B. The bell crank lever 122 itself is pivoted at the pivot 74 as previously described. The bell crank lever arm 122A, which extends up between the plates 75—75 of the spatulate buck structure, has spaced members and carries pivot 121 upon which the slotted lugs 119 is hung. The lever arm 122A extends down between the plates 75—75 and is bent so as to operate within the front opening in the base casting 69 and then extends downwardly to the pivot 74, whence it extends forwardly at the portion 122B. This forward portion 122B of the bell crank has a pivot at 123 and further out along this same arm there is a pivot 124.

Upon the same pivot 74 there is also mounted a lever generally designated 125 having an upper portion 125A, which is provided with a threaded downwardly extending aperture 125B and a lower portion 125C extends down below the pivot 74 and is provided at its lower end with a pivot 125D. To the aperture 125B there is threaded a manipulating rod generally designated 126 having a hand grip 127 and a lower threaded end 128 terminating at the tip 128A. The tip 128A is positioned so that it abuts against portion 69B of the casting 69. By turning the rod 126 it may be screwed into or out of the aperture 125B, thus bringing the upper end 125A of the lever closer or farther away from the portion 69B of the casting.

To the pivot aperture 124 in the lower portion 22B of the bell crank lever there is attached one element 130 of a toggle mechanism generally designated 132. The element 130 is actually in the form of a pair of spaced links attached to the pivot 124, and element 130 likewise terminates at the pivot 134, and at this pivot there is also attached the upper end of a rod 135 which is also a part of the toggle. The rod 135 is pinned to the upper end of tube 136 and the tube and rod are hence fastened together so that the rod 135 does not move with reference to the tube 136. The lower surface 137 of the rod, within the tube 136, serves as a stop. Within the tube 136 there also is positioned a rod 138 which is free to slide back and forth in the lower open end of the tube, the rod 138 being threaded into a block 140 that is pivoted at 47 on a bracket 142 attached to the front floor sill 14 of the press. The rod 138 is held from turning with reference to the block 140 by means of a lock nut 143.

Extending rearwardly from the block 140 is a short extension 144 which serves as an anchor for the lower end of a spring 145. The upper end of the spring is attached to a rod 146 which in turn extends upwardly and is pivoted at 123 in the lower portion 122B of the crank arm supporting the buck wing. From the lower end 125C of the lever 125 there extends loosely a chain 148 which has its front end attached at 149 on the tube 136 of the toggle. By pressing down on the control knob 127 so as to move the rod 126 in the direction of arrow 150 from the solid to the dotted line positions in Figure 8, the lower end 125C of the lever 125 may be correspondingly moved and this tensions the chain 148, thereby applying onto the toggle 132 a force rearwardly so as to cause its pivot 134 of the toggle to move in the direction of arrow 151. When this is done, the toggle may be moved from the position shown in Figure 1 to the position shown in Figure 12, and when this occurs, the lower end 122B of the crank arm supporting the buck wing 118 is permitted to be moved in the direction of arrow 152, Figure 8, and the buck wing is thereby propelled outwardly due to the downward pulling action of the spring 145. When the control knob 127 is moved from the full to the dotted line position of Figure 8, surface 125E of lever 125 impinges on plug 125F, which is provided with a resilient face 125G. This prevents surface 125E from continually impacting against casting 69 and peening the same. As will be seen with reference to Figure 8, plug 125F is adjustable inwardly or outwardly by being threaded into casting 69 to allow adjustment of the resilient face 125G.

Pressing down on control knob 127 functions, by breaking toggle 132, to cause a shirt sleeve, pant leg, coat sleeve, or other tubular garment section, that has previously been placed upon the buck, to be tensioned by the buck wing 118, it being noted that the central pivot 121 of the buck wing permits it to oscillate slightly about the pivot, thereby taking up any variation in taper in the garment section that may occur. The outer edge 118A of the buck wing is made to conform with the average taper of the usual garment section being pressed. It may be noted that the buck wings may be easily changed for changing the pressing set-up of the pressing machine.

Figure 13:
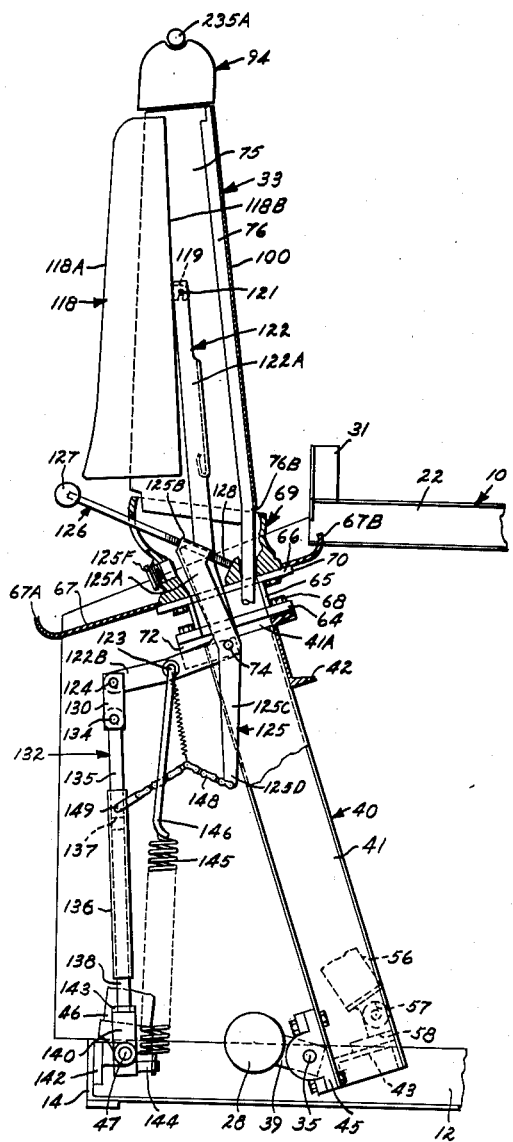

When the press closes, as hereinafter described, the pressing is accomplished, and during this closing action the tube 136 of toggle 132 is pulled up due to the closing action of the press which accordingly carries with it everything mounted upon the frame 40, including the buck, the buck wing, and the upper parts 130 and 135 and 136 of the toggle. However, as soon as the press starts closing, this increases the tension upon spring 145 and since the bottom end of that spring is anchored on the rearward extending end of the rod 144, a turning movement opposite in direction to arrow 151 is imposed upon the toggle as the press closes, and therefore tends to move the pivot 134 towards the front of the press, and this tendency is maintained while the press is closed and while it is then opening. Figure 13 shows the press just as it starts to close and as this tendency has already caused the toggle pivot 134 to again recover its position similar to that in Figure 1. As the press opens the toggle is maintained with the pivot 134 over center in the forward position and as the press finally approaches the Figure 1 position during its opening movement, the lower end 137 of rod 135 finally comes into abutment with the upper end of rod 138, upon which the tube 136 slides downwardly. When this occurs, just before the press reaches the fully open position, the toggle becomes effective and causes the lower arm 122B of the toggle to be pushed upwardly relative to the swinging frame 40 and in a direction opposite to the arrow 152. This relative movement causes the upper end 122A of the bell crank lever 122 to be moved inwardly in respect to the buck, and this draws the buck wing 118 into the space between the plates 75—75, thereby releasing tension upon the sleeve or sleeve and leg or other tubular garment section being pressed.

By rotation of the rod 126 the degree of over center movement of pivot 134 relative to a straight line between the pivots 124 and 47 can be varied. This is an adjustment easily made by the operator of the press during her work thereon. The amount that the toggle 132 is over center determines the force with which the operator must push down on the rod 126 to "set" the toggle to the shirt tensioning position; the more it is over center the more force is required downwardly upon the rod 126.

Referring to Figure 1 and Figures 19 through 21, there is illustrated the apparatus by means of which the front apron of the pressing machine is maintained covered when the bucks swing back into pressing engagement between the heads. As previously stated the frame 40 is pivoted at pivot 35 and it is swung from the loading position shown in Figure 1 to the pressing position shown in Figure 2 by the action of the air cylinder mechanism illustrated with particularity in Figures 16 through 18. On the frame 40 there is mounted a table 67. The table 67 has an upwardly curved front edge 67A and a corresponding upwardly curved rear edge 67B which serve to retain the remaining portions of the garment on the table as the frame and bucks swing from loading to pressing position. As illustrated in Figure 2, there is a substantial space shown by the dimension S which would be uncovered when the frame and bucks swing to pressing position were it not for the following apparatus: Referring to Figures 19 through 21, particularly, each of the frame legs 41 of the swing frame 40 have permanently attached thereto a forwardly extending strut 153. Pivoted on the forward ends of such struts are bell crank levers generally designated 154 having a long upstanding crank lever 154A and a short forwardly extending crank lever 154B. The bell crank lever 154 is pivoted at 155 to the forward strut 153. To the front end of the forwardly extending portion 154B there is attached at the pivot 156 the clevis 158 of a link 160 which is adjustable in length by means of the link 160, the lower end of which is pivoted at 161 upon the bracket 162 mounted on the frame member 28. The link 160 is screwed into each of the clevises 158 and 157 and is held in place by lock nuts, thereby allowing adjustment of the length 160, so as to adjust the position of the bell crank 154.

Upon the upper ends of the portions 154A of the bell crank there is mounted a sheet metal guard generally designated 164 which is bent over at 165 so as to be attached to the bell crank 154 and is bent down at the front edge 166. When the press is in the loading position of Figures 1 and 19, the guard 164 comes to rest beneath the forward portion of the table 67. However, as the swing frame 40 moves toward the pressing position of Figure 2, the frame 40 and table 67 move at a certain angular rate and due to the interlinkage composed of the bell crank lever 154 and 160 and the ratio of lengths of the arms 154A and 154B, the guard 164 is moved relative to the table 67 and is gradually drawn out through the position shown in Figure 20 to the position shown in Figure 21 and Figure 2, where the guard is fully exposed in underlapping relation in front of the front edge 67A of the table 67. In this position the front edge 166 of the guard overlaps slightly the rear edge 167B of a stationary guard 167, which is fastened at 167A on the cross frame member 20. It will be noted that the front to back dimension of the stationary plate 167 is such that it is just received beneath the guard 164 when the swing frame 40, table 67 and guard 164 are in the loading position, Figures 1 and 19. In this way the entire portion of the slot in which the table 67 moves back and forth, and the mechanisms below the table, are fully covered and protected as the table and press mechanisms swing to the pressing position of Figure 2. This contributes to operator safety and to the protection of the mechanism from entrance of extraneous materials.

Referring to Figures 1 through 7 and Figures 22, 23 and 24 particularly there is illustrated the presser head mechanisms shown under bracket 168 of Figure 1, of the pressing machine. The pressing head mechanisms include a right pair of presser heads 170—171 and a left pair of presser heads 172—173. Since the right pair 170—171 are identical with the left pair 172—173, the description of one pair will suffice, insofar as the construction and shape of these presser heads is concerned. Thus, referring to the right pair 170—171 the presser heads each are a double walled casting having an inner presser surface generally designated 174 for head 170 and 175 for head 171. In addition, each of the presser heads has a steam chamber, thus steam chamber 176 for the head 170 and 177 for the head 171.

Concerning the shape in general of the pressing surfaces, each of the pressing surfaces has a front flat area 174A and 175A which is of sufficient area to cover completely and extend slightly beyond the fully extended portion of the buck fin or wing 118 when the latter is in the fully extended position, as shown in Figures 5 and 23. These flat surfaces 174A and 175A terminate and blend along a smooth and relatively small radius 174B and 175B into a slanting portion 174C and 175C and thence around another bend at 174D and 175D to recessed flat areas 174E and 175E. These areas are of a sufficient length from the bottom to the top of the buck so as just to enclose the padded surface 100 of each buck. In this connection it will be noted from Figure 8 that the upper end of the buck is narrower than the lower end and that the upper end is cut "square" whereas the lower end of the buck, corresponding in the illustration to the shoulder seam of a shirt sleeve, is at an angle. Thus, referring to Figure 8 the buck generally designated 33 has a smaller front to back dimension at its upper end than at its lower end and the padding is at substantially right angles to the longitudinal axis of the buck at the upper end 33A, but is shaped at an angle along the lower end 33B. It will be understood, however, that the shape of the buck may be varied to accommodate the pressing of different shapes of garment elements, of tubular cross section.

The front to back dimension of the buck, however, is somewhat less than the front to back corresponding dimension of the head. Thus, referring to Figures 5 and 23 the front to back dimension FB, of the buck 33 is such that a clearance space C is permitted between the rear curved surface 33C of the buck and the corresponding curved surfaces 174F and 175F of the heads which taken together form a neat smooth curve against which the buck curved surface 33C seats and accomplishes a pressing function as shown in Figure 22. Thus, the curve 33C of the buck, as it enters the open presser head shown in Figure 22, has the shirt sleeve, coat sleeve, pant leg, etc., tautly pulled around it, the garment G being illustrated in Figure 22 as pulled neatly around the buck 33 except that it bridges from the curves 33D to the front curved surface 118A of the buck wing 118. Accordingly, when the buck enters the space between the open presser heads, as shown in Figure 22, only a longitudinal area lengthwise of the buck denoted by the dimension N, will contact the curved surface formed by the two portions 174F and 175F of the open head, and initially only this part of the sleeve or pant leg is pressed. The stopping position of the buck 33 is determined by the position of the heads 170 and 171. Due to their action in closing, the heads describe an arcuate path denoted by the arrows 178 of head 170 and 179 of head 171 and this draws the surfaces 174F and 175F away from the rear surface 33C of the buck, which is meanwhile held in approximately its stopping position due to heavy compression springs 180 mounted on the cross frame member 24 in a position such that the swing frame 40 will engage thereagainst at a position substantially coincident with the stopping position of the buck 33 in the open presser heads 170—171, the position shown in Figure 22. Therefore, as the heads 170—171 move arcuately, as shown by arrows 178 and 179, while being closed to the position shown in Figures 5 and 23, the bucks 33 and 34 will be held and as a result the curved portions 174B and 175B of the heads are brought onto the stretched portions of the garments between the curves 33C and 33D of the buck and the front edge 118A of the buck wing and these stretched portions of the sleeve will be brought down closely into proximity with the front of the buck padding and also against the flat outer surfaces of the buck wing 118, all as shown in Figure 23. At the same time a space C is left between the surfaces 174F—175F of the heads 170 and 171 and the rear curved surface 33C of the buck.

Another effect of the flexible stop springs 180 is to permit the swing frame 40 and the heads 33 thereon to maintain good ironing pressure even after the buck padding 98, 99 and 100 has been compressed thin. The springs 180 push the swing frame 40 and bucks 33—33 forwardly so that the bucks are always held against surfaces 174B, 174C and 174D of head 170 and surfaces 175B, 175C and 175D of head 171, even when the padding is compressed and thin. The heads 170 and 171 are free to move towards each other in the Figure 23 position and hence thinning of the buck pads does not cause decrease in ironing pressure, the edges 174F and 175F of the heads being at this time separated from each other.

The mechanism by which the heads 170—173 are supported and operated is as follows:

The upstanding frame members 21 at each side of the press terminate at their upper ends in the pad portions 21A which serve as a seat upon which a flexible mounting generally designated 181 is attached. This flexible mounting sometimes known as "rubber vibration mounting" is a standard article of commerce. It includes outer and inner metal sleeves between which the flexible filling of rubber is provided which is vulcanized to the sleeves. The outer sleeve is flanged and is pressed into frame 182 until the flange bottoms and rod 184 of the presser head frame is then passed thru the inner sleeve and held by nuts 185 thereon. By adjusting the nuts 185, the entire presser head frame can be raised or lowered. In addition the entire presser head frame is movable to a limited degree due to the flexibility of mountings 181 which are its sole support. By varying the composition of the rubber, the resiliency or rigidity thereof can be varied. The entire weight and support of the presser heads 170—173 is carried on the two rods 184 at each side of the machine, and in turn by flexible mountings 181.

These rods 184 are welded or otherwise attached to arms 186 which extend back and are attached to the frame member 188 which is composed of the angle iron uprights 189—189 that are welded to the horizontal plates 190—190. The angles 189—189 and the plates 190—190 thus form a rectangular frame as shown in Figure 6. Upon this frame are four vertical shafts as 191—194, these vertical shafts being simply round shafts which extend through suitable apertures in the bars 190—190. These shafts are vertical when viewed from the rear, Figure 6, but they have the slant of frame member 21 as viewed from the side of the press. Upon these shafts 191—194 are pivoted the heads operating levers 195—198. These levers are not quite identical in form, due to the fact that they support cylinders above and below each other, but in general it may be said that they each have a forwardly extending portion such as part 195A, a rearwardly extending portion 195B, a pivotal mounting at the pivot shaft, in this case 191 and a rear pivot at 195C which is operated either by a piston rod or the cylinder, as the case may be.

Thus, referring to Figure 6 the lever arm 198 extends rearwardly and has a bifurcated rear end terminating at pivot 198C, the pivot being a pivot pin 200. Upon the pivot pin there is pivotally mounted the apertured end 201 of the piston rod 202 that operates in a cylinder 204. The cylinder has its cylinder head 205 provided with trunnions 206 and 208 which are in turn held in the bifurcated rear end 197C of the lever 197. A suitable air supply is provided for the cylinder 204 in accordance with the air diagram hereinafter explained, and when air is introduced via the pipe 204A to the cylinder, the piston within the cylinder is moved to the left, as shown in Figure 6, thus driving the piston rod 202 outwardly (to the left shown in Figure 6) and as a result the cylinder 204 is driven to the right. Thus, the rear end of the levers 198 and 197 are in effect pushed apart and this causes their front ends 198A and 197A to move towards each other in the direction of the arrows 209 and 210, as shown in Figure 4. The front ends 198A and 197A of the levers are provided with hardened rounded tips which bear upon correspondingly hardened flat spots 211 and 212 upon the back of the pressing heads 170 and 171. These rounded buttons and the spots 211 and 212 are located at the centers of pressure of the pressing heads and thus the heads are pushed together.

Referring to Figures 6 and 22-23 it will be noted that the upper and lower ends of the presser heads each are equipped with a guide slot which is in the form of a small plate 213 at the upper end and 215 at the lower end of the presser head. The plates are attached to one or the other of the presser head members by screws, and the other end of the plate has a curved and open slot at 213A into which a pin 216, as shown in Figures 22 and 23 is adapted to slide and in doing so it very accurately locates the rear edges 174G and 175G of the presser surfaces.

Likewise on the rear surface of each of the presser heads 170—173 there is mounted a forked bracket 218, for presser head 170, and 217 for presser head 171, similar brackets being on presser heads 172 and 173. These brackets are forked and are positioned so as to slide upon and rotate upon the exposed upper and lower ends of the shafts 191—194, respectively. Thus, referring to the presser head 170, there is a forked bracket 218 at the upper end and a corresponding bracket at the lower end. Similarly, for the presser head 171 there is a forked bracket 217 at the upper end of the shaft and a corresponding forked bracket 217 at the lower end. These brackets also serve to guide the presser heads and serve as pivot points for them, but do not restrict slight movement of the heads toward and away from each other as presently described.

Along the rear edge of the presser heads and at a position between their upper and lower ends there are rearwardly extending protuberances 170A and 171A which have depressions in them to receive short compression springs 219 and 220. The other ends of these springs are seated in suitable paths 198D and 197D in the actuating levers. Referring to Figure 6, upon the free end of cylinder 204 there is mounted a downward extending lug 222 which serves as an attachment for one end of a spring 224, the other end of which is attached to an upwardly extending end 200A of the pivot 200. The spring 224 serves to retract the piston rod 202 into the cylinder 204, and in so doing it moves the rear ends of the levers 197 and 198 towards each other, thereby causing the opening of the presser heads relative to each other.

Exactly similar constructions are provided for operating the presser heads 72 and 73, except that the levers are arranged at different levels with respect to the levers for the heads 170—171, thereby avoiding interference between the operation of the presser heads.

Several types of motion are afforded by this mounting and operating mechanism of the presser heads. In the first place the entire presser heads may move or adjust their position pivotally around the resilient flexible mountings generally designated 181, this motion being as illustrated by the double arrow 225, Figure 1. This motion is relatively slight in amount but it does permit the presser heads to adjust themselves to the position of the rear area 33C of the buck as the buck enters between the open heads for the initial pressing of the area N longitudinally of the garment tube, such as the sleeve. Without this slight resiliency being provided, greater or lesser pressing effect would be produced upon one portion of the sleeve as compared with another. The flexible mountings also permit a very slight movement and adjustment of position of the presser heads transversely, as indicated by the double headed arrow 226, Figure 22.

In addition to these movements, the closure of the presser heads upon the buck utilizes several or all of the following motions: as the piston 202 moves outwardly in the cylinder 204, the forward end 198A and 197A of the lever arms are pushed towards each other. Therefore, there is a component of force upon the presser heads 170 and 171 at the pressure buttons 211 and 212 in the direction of the arrows 209 and 210. The position of the buck 33, however, between the heads acts as a spacer, and the buck has previously been in contact throughout its area 33C which is in contact over the pressing area N with a portion of the surfaces 174F and 175F of the presser head. As the front parts of the presser heads are moved arcuately in the direction of the arrows 209 and 210, a certain rolling pivoting action takes place about those portions of the buck marked by the dimension P, Figure 22, and in so doing the two edge surfaces 174G and 175G begin to move apart, their position being always determined by the shape of the buck between them. At the same time the action of the brackets 217—218 of the head about the shafts 194 and 193 is such as to provide a swinging movement of the heads rearwardly, as denoted by the arrows 178 and 179 and this, as previously described, draws the presser heads backwardly over the surface of the buck while it is rolling thereon in the areas P—P. The ultimate position of the presser heads upon the buck 33 is as shown in Figures 5-6-7 and 23, and as previously described, at this time there is a space C provided between the rear rounded surface 33C of the buck and the portions 174F and 175F of the presser heads. As the presser heads move towards the Figure 23 position, the forked brackets 217 and 218 pull away from the shafts 194—193, as shown in Figure 5, since the pressure upon the heads is at that time transmitted primarily through the pressure buttons 211 and 212 and the presser heads are free to seek their own position on the buck. In moving from the position of Figure 22 to the position of Figure 23 the highly polished surfaces of the presser heads are slid along the garment and produce an ironing action which yields an exceptionally fine finish on the pressed garment.

When the air is released from the cylinder 204, the heads will be returned to the position shown in Figures 4 and 22 under the influence of spring 224. It will be recalled that when the buck 33 is in this position the swing frame 40 has already abutted against the stiff springs 180 and as soon as the presser heads 170—171 begin to release from the buck 33, the latter accordingly tends to move quickly in the opening direction denoted by arrow 229, Figure 23.

Referring to Figures 22 and 24, it will be noted that the buck cover 100 is drawn tightly upon the buck padding along the line 100F, thereby providing a smooth curve at 100G. The base casting 69 is also curved adjacent this part of the buck. In order to hold the adjacent seam of a shirt sleeve or pant leg free from interference with the pressing operation, there is provided a spring 230 which is mounted on the frame of the press in the position shown in Figures 22 and 23. The spring is engaged by the sleeve or pant leg of the garment as the buck moves to the pressing position and is neatly held in the space 100H adjacent the curve 100G of the buck padding and out of interference with any of the adjacent press mechanisms.

The air cylinder 204 serves to operate the presser heads 170 and 171 and these presser heads are returned always to the open position by the return spring 224. An exactly analogous air cylinder 227 similarly mounted upon the arm 196 serves to operate a piston rod 231 which is pivotally attached to the rear end of the lever arm 195, and such piston rod is returned to a position within cylinder 227 under the influence of the spring 232. The two cylinders 227 and 204, and the arms on which they and their piston rods are mounted, are arranged so as not to interfere with each other mechanically, and each pair of presser heads accordingly operates as an independent unit, though simultaneously, due to the simultaneous application of air to the operating cylinders, as presently described.

Referring to Figure 8 to the upper ends of the metal plates 75 which serve to define the buck shape there is fastened a casting generally designated 94 which is attached in place by screws 95. In addition to forming a decorative and smooth exposed terminal end of the buck 33, these castings serve as a place for retaining the exposed and ironed or unironed cuffs of the shirt firmly in place during the pressing operation. The cuff clamp consists of a lever 235 which is pivoted about pivot pin 236 upon the lugs 238—238 that are a part of the casting 94. The casting 94 has a smooth transverse recess 94A into which a rounded ball end 235A which forms the operating handle of the lever 235 is disposed, these parts being smooth and rounded and since the ball 235A is at least partly recessed, it is unobtrusive in appearance and will not catch on the tubular garment sections as they are sleeved thereon. The casting 94 is provided with a recess at 94B through which the pivot pin 236 may be inserted. Likewise, within the casting 94 there is a transverse recess 94C and a longitudinal recess 94D through which the operating lever 235 extends, the two recesses being aligned. The lever 235 is preferably of round or oval cross section and against its sides there are pressed round balls 239—239 which operate within the recess 94C. These balls are held in place by the springs 240—240 that are in turn held in place by pins 241. The lever 235 may be moved transversely and it will be held in either position by the detaining action of the spring pressed balls 239. In the flat polished face of the casting 94, there is an aperture 94E through which there extends the shank 242 of the cuff clamp 244. The shank is firmly attached to the end of the lever 235 and over the exterior flat polished face of the casting 94 the cuff clamp extends at either side of the shank, as shown in Figures 1, 2 and 8. By appropriate movement of the ball 235A, the ends of the cuff clamp 244 may be moved outwardly from the face 94F of the casting 94 and the two placket edges of the cuff may be inserted under these ends. The ball 235A is pushed in the opposite direction, whereby the cuff clamp 244 holds the cuff edges and is retained in holding position by the action of the spring pressed detent balls 239.

Referring to Figure 6 it will be noted that the adjacent (inner) presser heads 171 and 172 of each of the pairs of presser heads have upwardly extending levers 245 and 246, respectively, thereon, these brackets being pivoted respectively at 245A and 246A on the presser heads. The lower ends of these levers are tied together by a spring 248. At the upper ends of the brackets are protruding lugs 245B—246B, respectively, that are aligned with the ball heads 235A of the cuff clamps when the frame 40 and the buck thereon is swung to the pressing position shown in Figure 2. However, when the pairs of heads 170—171 and 172—173 are in the "open" condition shown in Figure 3, the protruding ends 245A and 246A do not engage the balls 235A of the cuff clamps. However, when the presser heads are moved to "squeezing" condition, as when air is introduced into the squeezing cylinders 204—227 (Figure 6) the protruding ends 245A and 246A will then reach into contact with the adjacent face of balls 235A—235A, respectively, and will cause these balls to be displaced sufficiently so that they will thereby carry the levers 235 across the over center position as determined by the retaining detent balls 239—239 (Figure 8), and the cuff clamp will thereby be "snapped" to the cuff releasing condition. The spring 248A is attached to the upper ends of levers 245 and 246 and is weaker than spring 248. It keeps the levers 245 and 246 generally centered and retracted from both sides.

Referring to Figures 4, 5, 6 and 7, the large spring 224 (Figure 6) is of sufficient strength to determine the position of operating arms 197 and 198 when air is released from cylinder 204. Referring to Figure 4, particularly, spring 219 is between lug 170A (on head 170) and recess 198D on arm 198. Similarly, spring 220 is between lug 171A (on head 171) and pad 197D on arm 197. Springs 219 and 220 are strong enough to force the heads to open position and in so doing surface 174G of head 170 (see Figure 23) and 175G of head 171, are brought into contact. Since springs 219 and 220 exert their force behind surfaces 174G—175G (as viewed from the front of the press) the reaction is to pivot about these surfaces and particularly about the contact edge 174F and 175F (see Figure 22) and this brings the pads 211 of head 170 against the hardened button on the end 198A of arm 198 and brings the pad 212 against the corresponding hardened button 197A on arm 197. Meanwhile bracket 218 on head 170 and bracket 217 on head 171 have, in each instance guided the head to which it is attached, about pins 194 and 193 respectively.

The air control circuits

Referring to Figure 27 there is schematically illustrated the air control circuits and the various adjuncts composing the same. Thus, in this figure there is illustrated the closing cylinder 46 pivoted at 47 and operating its piston 48. The closing cylinder is provided at 250 with an air connection. Similarly, the two squeezing cylinders 204 and 227 are also illustrated. Cylinder 204 operates its piston 202 and cylinder 227 operates its piston 231. The cylinder 204 is provided with an air inlet 204A and the cylinder 227 is provided with an air inlet 252. Upon the front apron 30 of the press there is mounted a hand control valve generally designated 254. The air circuit also includes a timing valve shown under the bracket 255, a closing pilot valve 256 and a squeezing pilot valve 257. All of these elements of the air circuit will now be described in greater detail.

The hand control valve 254 is mounted by a bracket not shown on the apron 30 or the frame of the press and has a rocker plate 258 pivoted at 259. The rocker plate is pushed in the direction of arrow 404 to initiate operation of the pressing cycle; when pushed in the direction of arrow 405, the cycle is stopped and the press immediately opens. Two separate push buttons (start and stop) could be substituted. Under the rocker plate 258 are the two operating buttons 260 and 261 of the opening control valve and closing control valve respectively, these valves being designated, respectively, 262 and 263. The two buttons 260 and 261 could be exposed and pushed directly, if desired. The valves are both built into a single case 265 for convenience but may be made separately. The valve stems 262 and 263 operate in the bores 266 and 267, respectively. The stem 262 has the button 260 mounted on its upper end and the button is pushed outwardly by the spring 268. A sealing ring (O-ring) is supplied at 269. The lower end of the valve stem 262 has a reduced portion at 270 and a valve head at 271 which operates against the seat 272. From the bore 266 there is an exhaust port for line 273. The stem 263 of the closing control portion of the combined hand control valve 254 likewise has the button 261 firmly attached at its upper end and the button is pushed upwardly by the spring 274. Stem 263 likewise has a sealing ring at 275 and a reduced portion at 276 terminating in the valve heads 277, the valve heads seating upon the resilient seat 278. Cross bore 279 connects the bore 267 and the surface of the casing outside the valve seat 272. A common cover 280 covers both valve heads and provides a chamber 281 having the air connection 282 and another chamber 283 having the air connection 284.

Referring now to the closing pilot valve 256 and the squeezing pilot valve 257, pilot valves are optionally used and are preferred because they permit the air circuit to handle the requisite quantities of air very quickly, thus affording a smart action of the press, and provide certain safety effects. The pilot valves are of identical construction and therefore only one need be described in detail. Referring to the closing pilot valve 256 it has a main cylinder 290 and is closed at one end by the cylinder head 291 and at the other end by the cylinder head 292, the cylinder heads being held together by through stay bolts, not illustrated. The cylinder 290 has a central bore 293 having an exhaust port 294 therein. The central bore is enlarged at its lower end 295 and at the junction of the two diameters of this bore there is provided an O-ring 296 which acts as a good valve seat. Against this seat there operates a valve 298 having a large head 299 against which there pushes the spring 300 causing the head 299 to seat against the O-ring 296. The valves 298 also have a conical end 301 which, as subsequently described, also serves for valve action. The center bore 293 of the main cylinder 290 has a port at 302 which connects to the line 303, it being noted that the main cylinder has a drilled by-pass 304 connection to this port. The by-pass 304 extends up to the upper end of the central cylinder 290 and connects to a cross bore at 305 for a purpose to be described. The spring 300 seats in a central recess in the cylinder head 292 and this recess has a port at which pipe 306 is connected. At the upper end of the central bore 290 there is a first enlargement 308, and this is drilled out to a still larger diameter at 309. There is thus provided within the main cylinder 290 a central bore having a minor diameter 293, an enlargement at 308 and a maximum diameter at 309, the upper end of the central cylinder 290 being capped by the cylinder head 291 having a port 310 to which the piping connection 311 is made. In the bore 293—308—309 there operates an air controlled plug valve generally designated 312 which has appropriately placed O-rings 314 and 315 which seal it. The plug valve 312 has a central bore 316 at its lower end and has an O-ring 317 at its outer terminus acting as a valve seat. It is against this O-ring that the upper conical end 301 of the lower valve member 298 operates to provide valve action. The central bore 316 is cross bored at 318 and where the cross bore terminates the valve member 312 has a somewhat reduced diameter 319 throughout a portion of its length. This reduced diameter portion operates in communication with the exhaust port 294. Within the medium diameter portion 308 there reposes a spring 320 which seats against a step 321 on the valve member 312 normally causing it to move in the upward direction. The upper end of the valve member 312 is a piston at 322 which has an O-ring at 323 acting as a piston ring. In operation when air is introduced through line 311 it pushes down on the piston 322, thus causing the entire member 312 to move down against the action of spring 320. The first action is to bring the O-ring valve seat 317 against the conical end 301 of the lower valve member 298, thereby closing off this valve port which leads to exhaust port 294. Then the valve member 312 continues its downward movement, meanwhile pushing the valve member 298 downward until it is left free from the O-ring seat 296. This unseats the valve surface 299 from the O-ring 296, thereby opening this valve port.

If desired the drilled by-pass 304 may have an adjustment valve screw 324 provided in it.

Referring to the timing valve shown under the bracket 255, this valve has a body 330 which is attached by bracket 330A to frame 15 as shown in Figure 3. The valve body, as shown in Figure 27, has three drilled valve passageways 331, 332 and 333. Each of these valve passageways has a side port, as port 334 for the passageway 331; 335 for the passageway 332; and 336 for the passageway 333. Below these ports 334—336 each of the drilled passageways has an enlarged diameter as at 337, 338 and 339. In the passageways there operate three identical valve stems 340, 341 and 342, only one of them need be described in detail. Referring to valve stem 340 it has O-rings at 343—343 which serve to seal the stem to the bore and is provided at its lower end with an enlarged head portion at 345. Each of the enlarged diameter portions 337, 338 and 339 of the passageways is provided with a valve seat which, in the illustrated form, is an O-ring, such as O-ring 346 in the passageway 337.

Hereinafter these valves will be referred to by the stem numbers as 340, 341 and 342. The lower enlargement of the passageway in which each of the valves operates is provided with a plug cap suitably attached, such as cap 348. Each of the caps has an air connection as at 349 for the cap 348. Each of the caps also serves to support a spring 350 which normally pushes the valve stem up to closed valve condition. There are thus provided the air ports 349, 351 and 352 for valves 340, 341 and 342, respectively.

The control of the valves 340, 341 and 342 is by means of a lever 347 pivoted for operation on the shaft 353, and they are arranged so that valve 340 closes, then valve 341 opens and then valve 342 opens, in timed sequence. This is accomplished as follows: The shaft 353 journalled in casing 330 is provided outside the casing 330 with an operating arm 354 having a pin 355 at the lower end, to which spring 356 is attached, the upper end of the spring being attached to the pivot pin 155 on the arm 153 that is, in turn, mounted on the swing frame 40 as shown in Figures 3, 19, 20 and 21. The arm 153 in Figure 27 is shown in full lines in the press-open position and is shown in dotted lines in the press-closed position, the movement of the arm 153 from press open to press closed position being in the direction of arrow 357. This movement pulls the upper end of the spring 356 from the full to the dotted line positions, thus moving past the center of shaft 353, thereby imposing a turning force in the direction of arrow 358 upon the operating arm 354. When this occurs the shaft 353 is moved in the direction of arrow 359 and likewise so moves the lever 347. The tendency of movement of the left end of the lever 347, as shown in Figure 27, is therefore downward but its rate of movement is controlled by an oil (or air) cylinder 360 having a piston 361 movable up and down in it. A piston pin 362 is connected by the link 363 to the pivot 364 on the lever 347 and accordingly as the lever 347 moves downwardly, it must also push the piston 361 downwardly in the cylinder 360. The lower end of the cylinder is open at port 365 to a control valve bore 366 which has a ball valve 367 in it. The ball is normally pushed upwardly into the tapered bore 366A by the spring 368 but its position may be adjustable by the stem 369 which screws at 370 in the cover plate 371 for the valve body 330. By rotating the stem 369 by means of its control knob 372, the position of the ball 367 can be very accurately adjusted, thereby providing a nicely controlled oil escape orifice. At the same time the ball 367 is free to move downwardly against the action of spring 368 when the piston 361 moves upwardly, thus again drawing the oil (which accumulates in the space 374) back downwardly through the bore 366A and into the cylinder 360. The ball being thus relieved from the tapered bore 366A, cleans the orifice of any dirt that may accumulate due to oil upflow.

The lever 347 has on it appropriately positioned pins 327, 328 and 329 which are positioned so as to hit against the upper end of the valve stem 340, 341 and 342, thus operating them in timed sequence as the shaft 353 operates. The position of pins 327—329 may be changed to adjust timing, or the upper ends of the valve stems may be provided with tappet adjustment cap screws and lock nuts as in the automotive engine art.

The lower face of the valve body 330 is covered by the cover plate 375 which has a lug projection at 376 upon it serving to support the adjustment screw 377 that acts as a limit stop for the backward lever 354.

Piping connections, as shown in Figure 27, are as follows: The air supply 380 is connected at the junction 381 to line 382 and is connected through line 383 to junction 384. From junction 384 the line 383 continues to port 306 on the closing pilot valve. From junction 384, the line 385 connects to the port 349 of the timing valve. From the timing valve 255 port 334, a line 386 connects to port 282 on the manually controlled valve and from port 284 of the manually controlled valve a line 387 connects to junction 388 and thence line 387 continues to port 311 of the closing pilot valve. From the junction 388 a line 389 extends through an optional timing reservoir 390 and continues at 391 and is connected to the port 352 of the timing valve. If the line 391 is of sufficient size the timing reservoir 390 may be omitted. From the closing pilot valve port 302 a line 394 extends to the junction 395 and thence continues at 394 to the port 250 of the closing cylinder. From the junction 395 a line also extends at 396 to the port 351 of the timing valve 255.

From the squeezing pilot valve port 397 a line extends at 398 to junction 399 and thence continues to the air connection 252 of the squeezing cylinder 227. From junction 399 a line also extends at 400 to the air connection 204A of the squeezing cylinder 204. From the port 397 and within the body of squeezing pilot valve there is provided the by-pass 401 controlled by the optional screw valve 402 connecting through the cross bore 404. The piston and valve member generally designated 405 of the squeezing pilot valve operates to open and close its port 406 as previously described with reference to the closing pilot valve and also operate the lower valve member 407 that is normally held up by the spring 408. Above the piston 409 of the central valve member 405 there is the cover plate 410 to which the line 411 is connected, this line being connected at its opposite end to the port 335 of the timing valve 255. The squeezing pilot valve has an exhaust port at 412.

Operation

It will be assumed that the press is in the "open" position shown in Figure 1 and that air under pressure is supplied on line 380. In this position it will be noted that the wings 118 are retracted into the spatulate bucks. The operator then places a shirt, coat or the like tubular garment on the spatulate bucks. In the illustration the form of buck is for a man's shirt and hence the two shirt sleeves of a shirt are "sleeved" onto two bucks with the cuff opening toward those parts of each buck which faces the other buck. The edges of the cuff are then arranged under the clamp 96 which has been previously released automatically and the knob 235A is pressed towards the opposite buck where it is retained by the detent balls 239—239. The operator then straightens each sleeve on the buck and when it is straightened, presses down on the knob 127, thereby causing the toggle 132 to be moved to the "broken" position shown in Figure 12. This releases the wing 118 of the buck and causes the sleeve to be pulled taut around the spatulate buck, as shown in Figure 22. It will be noted that in this figure the tubular garment member G stretches from the thicker portion of the buck 33 out over the edge 118A of the wing 118. This free stretch of the tubular garment member is later taken up during the pressing operation, see Figure 23, the wing being pulled in against the pressure of springs 145. It is noted that springs 145 act not only as the bias to pull the swing frame and bucks to loading position (Figures 1 and 15) but also in so doing bias the buck wings 118 toward their projected positions in respect to each buck.

After these preliminary operations the pressing operation, per se, is then ready to proceed and to do this the operator needs only rock the controller 258 by pressing in the direction of arrow 404, Figure 27.

Before proceeding with the explanation of the ensuing operations, it is desirable to consider the state of the air circuits as shown in Figure 27:

The valve members 407 and 298 of the squeezing and closing pilot valves 257 and 256, respectively, are pushed upwardly by their springs and accordingly no air is admitted past these valves. The timing valve mechanism 255 is in the open press position shown in Figure 27 and the stem 340 of the safety control valve is pushed downwardly against the spring 350. Accordingly air under pressure is admitted via line 383, junction 384, line 385, through the valve 345—346 and thence through port 334 and line 386 to port 282 of the hand control valve 254. The spring 274 pushes upwardly against the button 261 and accordingly the closing valve 263 is closed at head 277. The valve 271 is also closed against its seat 272 and the stems 312 of the closing pilot and 405 of the squeezing pilot are both in their uppermost position.

The operator then pushes momentarily on the rocker control plate 258 in the direction of arrow 404 as previously mentioned, and the press then proceeds automatically to complete the entire operation. Pressure on plate 258, in direction 404, opens the valve 263 thereby admitting air under pressure through the cross bore 279 and since the valve 271—272 is closed, air under pressure is accordingly delivered via line 387 to the junction 388. From junction 388 air passes through the line 389 (thru timing reservoir 390, where used) and line 391 and to port 352, but since the valve stem 342 is pushed upwardly no air is admitted past this valve to the port 336. However, air under pressure from junction 388 is admitted against the upper surface of piston 323 in the closing pilot valve 256, thereby pushing portion 322 and valve stem 312 down. The first effect of this is to close the valve 301—317 and thereafter the valve member 298 is pushed down, opening the valve 296—299. Accordingly, air under pressure, which has stood at valve 296—299, enters from the air supply 380, line 383, port 306, through the then open valve 296—299 and passes through the port 302, line 303, through junction 395 and into the closing cylinder 46. Some of this air is by-passed back through the by-pass passageway 304 to the upper end of the piston head 322, thereby maintaining the piston head down even through the hand control is quickly released and regardless of any slight leakage that might occur in the piping system connected to the port 310. Air is also admitted from junction 395, through line 396 to port 351 of the valve 330, but since the valve stem 341 is up (and hence closed) no air passes to the port 335 at this time.

The press then closes due to the action of the closing cylinder 46 and this brings the bucks 33 and 34 into pressing engagement with the back pressing area N, Figure 22, of each of the then open pairs of pressing heads 170—171 and 172—173, thereby causing pressing of the area N of the stretched sleeve on each of the spatulate bucks. The spatulate bucks are moved to press closing position through the swinging of the frame 40 from the position shown in Figure 1 to the position shown in Figure 22. This is close to, but not quite at the final position shown in Figure 2. Thus, the extension 153, is moved from the full to the dotted line position shown in Figure 27, thereby imposing a turning moment on the lever 354 of the timing valve 255, in the direction of arrow 358 as above explained. Accordingly, as soon as the spatulate bucks begin their pressing operation, the timing valve 330 also is caused to begin its movement, but the movement is restricted to a controlled rate (timed), due to the controlled rate of flow of the fluid (such as oil, synthetic liquids or air) from below piston 361 through the metering valve 366A—367. This metering action is adjustable as previously described so as to allow time for pressing areas N of the sleeves before the ensuing operations. However, before expiration of the aforesaid initial pressing interval, the first valve stem 340 is permitted to rise to a position such that its head 345 engages the valve seat 346, thereby closing off air supply to the port 334. The valve stem 340 is a safety feature and is optionally included and may be omitted, in which case an air connection is made between 385A and 386A. Use of valve 340 is recommended, however, because of the several safety provisions which it enables. It is valuable during adjustment of the press as when the bucks may be pushed manually to the closed position. When thus pushed manually to the closed position and held in such position for adjustment of the buck pad, etc., the timing valve is caused to begin its metering action, and if the time interval is long enough, and if the button 258 should be pushed, there would be caused an immediate closing of the heads upon the bucks, thereby endangering the person adjusting the press. By having the valve 340, as illustrated, a preliminary (short) timing interval elapses and then the stem 340 closes its valve and deprives air under pressure from flowing into the line 386 to manual valve 254, thereby preventing the aforesaid possibility. There are also additional safety advantages, as when the lever arm 354 may be pulled over toward press-closed position, by hand or accidentally during adjustment or working on the press. Likewise, if the spring 356 should break and stall, the valve 330 in press-closed position, the subsequent squeezing operation would be forestalled. Accordingly, while the valve 340 may not be considered as strictly essential its inclusion is very desirable and is recommended for the safety provision which it enables.

The primary timing operation for pressing area N, Figure 22, imposed by the movement of the timing valve 255 is determined by the operation of valve stem 341 which is pushed down at a time when the pressing of areas N of the sleeves has been completed. This can be adjusted by changing the position of screw 377. Air under pressure, which has been standing at this valve, is then admitted to port 335 and via line 411 to above the piston 409 in the squeezing pilot valve 257, thereby driving piston of the valve stem 405 smartly downwardly. This first closes off the exhaust valve portion 406 and then opens the air inlet valve 407, accordingly driving air under pressure to the port 397 and via line 398 to the squeezing cylinders 204 and 227. This causes the pressing heads 170—171 and 172—173 to be brought to their final position as illustrated in Figures 2, 5, 6, 7 and 23, thereby completing the pressing operation of both sleeves simultaneously.

When the swing frame 40 is moved into the preliminary pressing position shown in Figure 22 frame 40 comes close to but not quite into contact with the heavy springs 180 and the springs are therefore not placed under compression. When the timing mechanism has caused the bucks 170—170 and 172—173 to be brought to their final position of Figure 2, pressure is brought on the springs 180, which is in a direction to move the swing frame 40 forwardly, causes the front shoulders 33D—33D of the buck to be pushed forwardly against the curved surfaces 174B—174D and 175B—175D of the heads, thus insuring ironing pressure in this area, as previously described.

Likewise as the bucks move to their final ironing position shown in Figure 6, the presser bars 245B and 246B are then aligned with the control knobs 235A of the cuff clamps and press these knobs outwardly to the unclamping position, thereby releasing the cuff clamps. Nothing happens, of course, at this time since the ironing operation is still in progress and the sleeves are tightly held between the bucks and heads.

The timer 255 continues to operate and as the piston 361 reaches a lowermost position, the pin 329 presses down on the valve 342, which accordingly opens the passage from port 352 to 336. Up to this time air stood under pressure in the line 387 above the closing pilot valve and back to junction 388, to piston 322, and in lines 389, 390, 391 to closed valve 342. The manual opening control valve 262 was, of course, closed, and with the closing pilot valve operated, air, if needed, continued to be delivered through the then open valve 296—299 to port 302 and thence through the by-pass 304 to above the piston 322, and hence to line 311, thereby maintaining pressure on this line and also upon the line 389—391 against the previously closed valve 342. However, the passage 304 is small and can, if desired, be metered by valve 324. Accordingly, as valve 342 is pushed down, it opens the passage from line 391 to exhaust port 336, and the air standing in this line is so rapidly exhausted from the port 336, that pressure cannot be kept up by air flow through valve 324 and passage 304, and consequently pressure on port 310, line 311 and all lines connected to junction 388 is reduced, thereby permitting the spring 320 in the closing pilot valve 256 to push the valve stem 312 and piston 322 upwardly. The first effect is to seat the valve 298 against its valve seat, thereby closing off air from the supply line 383, the next effect being to unseat the valve 301 from its seat. When this occurs, the exhaust is opened from the press closing cylinder 46, through line 394 junction 395, and line 303 to port 302, and thence through the then open valve 301—317 and through the passage 316, cross bore 318 to exhaust port 294, thereby quickly exhausting the closing cylinder. Even though air is exhausted from the closing cylinder, the press does not immediately swing to press-open position, since the pressing heads 170—171 and heads 172—173 are still tightly gripping the bucks. However, the closing cylinder 46 being thus initially exhausted offers no subsequent impediment to the prompt opening of the press once the heads loosen their grip upon the sleeve bucks which therefore are ready to swing forward immediately upon being released. This is an advantage since it prevents malfunctioning of the machine. Accordingly, when the line 394, junction 395 and cylinder 46 are sufficiently exhausted, this will exhaust the squeezing pilot valve 257 because line 396 is connected through the port 351 and the then open valve 341 to the port 335 and through line 411 to above the piston 409 in the squeezing pilot valve 257, thereby permitting the piston and valve stem 405 to move upwardly. This initially closes the air supply valve 407 and then upon further movement opens the exhaust valve portion 406, accordingly opening an exhaust from the squeezing cylinders 204—227 through lines 400 and 398 to junction 399 and line 398 to port 397 and through the valve 406 to the exhaust port 412 of the squeezing pilot valve. As soon as the squeezing cylinders have exhausted they are moved to press open position by action of springs 194 and 224, 219 and 220, and hence swing to the press-open position due to the action of the return spring 145.

In moving to the press-open position, the toggle mechanism 132 proceeds through the position shown in Figure 13 to the position shown in Figure 15 in which the wing 118 is retracted. The wing 118 is retracted at the last part of the swinging motion of the spatulate bucks to their loading position. At the same time the guard 164 is neatly retracted under the table 67, as shown in Figures 1 and 19. Since the cuff clamps have already been released, the operator then need only strip the loosened and ironed sleeves off the spatulate bucks and proceed with the next shirt.

The supply of steam by way of pipes 84—84 to the inner tube 81 into the framework of the bucks, as shown in Figures 8, 9, 25 and 26, causes an intense heating of the pipe 76, and since the pipe is connected in thermal communication to the plate 75—75, preferably by welding, the heat is readily conducted through the plates 75 and hence to the under side of the buck padding 98, 99 and cover 100. This insures an even and adequate heating of the buck to remove the relatively large amounts of moisture that must be driven off during fast operation of the press.

When it is desired to open the press by hand the control 258 is pushed in the direction of arrow 405, thereby pushing the valve stem 262 downwardly and open the valve 271—272. This has the effect of exhausting line 387 which has the same effect as when this line is exhausted by the timer valve 342, as previously described.

As many apparently widely different embodiments of this invention may be made without departing from the spirit and scope thereof, it is to be understood that we do not limit ourselves to the specific embodiments herein.

What we claim is:

1. A pressing surface composed of two cooperating pressing elements each including a groove lengthwise therein, said groove having a cooperating meeting edge at one side and a cooperating pressing flange at the other side, means mounting said pressing elements with the groove, meeting edge and flange of the one cooperating pressing element facing the corresponding portions of the other and for limited rocking movement about an axis generally normal to the grooves thereof, means connecting said pressing elements and for guiding said meeting edges into engagement with each other, the grooves of the pressing elements forming together an internal generally tubular longitudinal space into which access is available through the space then existing between the pressing flanges, the portion of said grooves of the pressing elements adjacent the meeting edges forming together a combined smooth pressing surface generally opposite said space through which access may be gained, an elongated form having a thickness such that it can be entered by edgewise movement through said space and having an edge shaped for pressing engagement with said combined smooth pressing surface for pressing a longitudinal strip of a garment sleeved thereon, the remainder of the grooved pressing surfaces and flanges of the pressing elements being shaped so as to be out of contact with said form when said meeting edges of the pressing elements are in contact, means connected to the form for moving said form thus edgewise into pressing engagement with said smooth pressing surface for ironing said longitudinal area of a tubular garment component sleeved on said form and means for then moving the presser heads pivotally about axes generally longitudinal of said pressing elements and for simultaneously moving them towards each other in a direction to bring the remainder of said grooved surfaces and flanges towards each other and against said form to complete ironing of the remainder of the tubular garment component and for simultaneously rocking those portions of said grooves forming the smooth combined pressing area substantially out of contact with said longitudinal area of the form.

2. The apparatus as specified in claim 1 further characterized in that resilient stop means is provided for limiting the movement of the form in a direction which is towards said combined smooth pressing surface.

3. The apparatus of claim 1 further characterized in that said form has a shape longer than said grooves so as to project therefrom and has a resiliently extensible wing at one edge which is contacted by the pressing flanges and has a width transversely of the groove at any position therealong, which is slightly less than the width of the groove at the same position.

4. The apparatus of claim 1 further characterized in that said form and pressing elements are shaped to take a tapered sleeve, and said form projects beyond one end of the groove and said projecting end is provided with a cuff clamp having an operating member projecting slightly therefrom, said operating member being movable in one direction to a detained position in which the cuff is clamped, and said one pressing element has a part thereon for moving said operating member in the opposite direction to a position to unclamp the cuff when said pressing element moves toward the form for pressing a sleeve thereon.

5. The apparatus of claim 1 further characterized in that said means for mounting the pressing elements includes a frame, said pressing elements being mounted for limited rocking and sliding movements toward and away from each other on said frame, said frame in turn being mounted for limited resilient movement predominately about an axis generally normal to the axis of rocking of said pressing elements.

6. The apparatus of claim 5 further characterized in that said means for moving the pressing elements towards each other comprises power cylinders mounted on said frame.

7. The apparatus of claim 1 further characterized in that said form projects beyond the ends of said pressing elements and means is provided adjacent one end of the pressing elements for resiliently retaining tightly against said elongated form portions of the garment sleeved thereon which are adjacent to but slightly beyond the area of contact by said pressing elements.

8. A pressing machine comprising a frame, first and second pivots mounted generally parallel to each other on said frame, a pair of levers, each lever being pivoted intermediate its ends on one of said pivots, said levers having opposed operating ends generally in the same plane, power means connected to opposite adjacent ends of the levers for pushing them from a first position toward a second position in which the opposed operating ends of said levers are brought towards each other, biasing means for returning the levers to a first position in which the opposed operating ends are a maximum distance from each other, a presser head connected to each lever so as to be operated thereby, said heads forming a pair for cooperating pressing action, means mounting one of said heads on each lever for pivotal and sliding movement with respect to the pivot of its lever, each of said heads having a meeting edge and a pressing flange spaced from each other and connected by a smooth groove forming with said edge and flange, a combined pressing surface, said presser heads being mounted between the levers and oriented so that the groove, meeting edge and pressing flange of one generally faces the corresponding portions of the other, resilient means between each of said pressing heads and its lever for urging each of the pressing heads for pivotal movement about the pivot of its lever and towards the opposite head to bring the meeting edge of one into engagement with the meeting edge of the other and to spread said pressing flanges and the adjacent portion of said groove of the pressing surfaces apart from each other, the portion of the groove of the pressing surface of one pressing head adjacent its meeting edge forming, with the corresponding portion of the groove of the pressing surface of the other head a combined smooth pressing area, a portion of each lever removed from said power means being in contact with a pressure center of its pressing head for exerting pressure thereon for moving each of the pressing heads in a combined pivotal and sliding motion for bringing the pressing heads generally and particularly the pressing flanges thereof towards each other, said pressure center of each of the pressing heads being at generally the center of moment of said pressing heads for exerting substantially uniform ironing pressure on the pressing surfaces, an elongated form having a width, thickness and shape such that the grooves of the pressing head will substantially enclose the form when the presser heads are moved by the levers towards each other and against opposite faces of the form, said form having a wing thereon for stretching a tubular garment member tightly on the form, said wing being located so as, when extended, it will be contacted by said flanges as the presser heads are brought together, and means mounting the form for movement to and from a pressing position between said pressing heads.

9. A pressing surface composed of two cooperating pressing elements each including a groove lengthwise therein, said groove having a cooperating meeting edge at one side and a cooperating pressing flange at the other side, means mounting said pressing elements with the groove, meeting edge and flange of the one cooperating pressing element facing the corresponding portions of the other and for limited rocking movement about an axis generally normal to the grooves thereof, means comprising a guiding groove on one element and a pin on the other element located for movement into said guiding groove for connecting said pressing elements and for guiding said meeting edges into accurate alignment upon engagement with each other, the pressing flanges being thereupon spaced from each other and the grooves of the pressing elements forming together an internal generally tubular longitudinal space into which access is available through the space then existing between the pressing flanges, the portion of said grooves of the pressing elements adjacent the meeting edges forming together a combined smooth pressing surface generally opposite said space through which access may be gained, an elongated form having a thickness such that it can be entered by edgewise movement through said space and having an edge shaped for pressing engagement with said combined smooth pressing surface for pressing a longitudinal strip of a garment sleeved thereon, the remainder of the grooved pressing surfaces and flanges of the pressing elements being shaped so as to be out of contact with said form when said meeting edges of the pressing element are in contact, means connected to the form and mounting it for radial movement edgewise into a position for pressing against said smooth pressing surface for ironing said longitudinal area of a tubular garment sleeved on said form, first power means for moving said form radially, second power means for moving the pressing elements by a combined motion pivotally and towards each other into a position to bring the grooves and pressing flanges into contact with opposite faces of the form, and operator actuated means for operating the first power means, and time delay control means connected to the form so as to be actuated thereby and connected to said second power means for controlling the latter.

10. The apparatus of claim 9 further characterized in that manually operable operator control means is provided for initiating the actuation of said first power means, and means automatically operated thereby for initiating the actuation of the second power means for de-actuating both of said power means.

11. The apparatus of claim 10 further characterized in that said means automatically operated actuates the second power means to bring the pressing elements into pressing engagement with the form and then de-actuates the first power means and the second power means all in timed sequence.

12. A pressing machine comprising a main frame, an elongated buck for receiving a tubular garment member sleeved thereon, a swing frame pivotally mounted upon a substantially horizontal axis on the main frame for supporting the buck for radial swinging movement from a loading position to a pressing position, a pair of presser heads mounted on the main frame for movement toward and away from each other at the pressing position, said heads being shaped substantially to encompass the buck in said pressing position, an apron substantially enclosing the main frame except for a slot through which said buck extends, said slot extending from the loading to the pressing position, a table mounted on the swing frame adjacent one end of the buck over said slot for supporting portions of the garment not being pressed and partially covering said slot, a guard pivotally mounted on the frame and connected to the swing frame so as to be operated thereby, said guard being mounted for pivotal movement to a position for covering portions of said slot in front of the buck when the swing frame, buck and table move to pressing position.

13. The apparatus of claim 12 further characterized in that the guard is mounted for swinging movement below the table and at a rate of movement less than the swinging movement of the table for continuously covering portions of the slot left uncovered by the tray as the swing frame, table and buck swing from loading to pressing position.

14. A pressing machine having a main frame, a swing frame mounted for swinging radial movement to and from a front loading position and a rearward pressing position on the main frame, the pivot axis of said swing frame being near the bottom of the main frame and transversely thereof between the front and back of the main frame, an elongated buck mounted on the swing frame extending generally radially in respect to the pivot axis of the swing frame, said buck being shaped for receiving a tubular garment member, such as a garment sleeve, a pair of presser heads mounted on the main frame for engagement with opposite sides of the buck when the swing frame and the buck move rearwardly on the main frame, power means for actuating said presser heads and power means for moving the swing frame and the buck thereon pivotally comprising power cylinder means including a cylinder piston and piston rod, said power cylinder means having one end pivotally connected adjacent the front lower portion of the main frame, a link having one of its ends pivotally connected to the other end of the power cylinder means and its other end pivotally connected to the swing frame and a radial stay link pivotally connected to the pivotal connection of the link and the power cylinder means and pivotally connected to the main frame adjacent a lower rear portion thereof and a resilient bias for normally pulling the swing frame forwardly to loading position.

15. The apparatus of the type set forth in claim 14 further characterized in that a resilient stop is provided on the main frame for stopping the swing frame and buck carried thereby at a position between said presser heads.

16. A pressing surface composed of two cooperating pressing elements each including a groove lengthwise therein, said groove having a cooperating meeting edge at one side and a cooperating pressing flange at the other side, means mounting said pressing elements with the groove, meeting edge and flange of the one cooperating pressing element facing the corresponding portions of the other and for limited rocking movement about an axis generally normal to the grooves thereof, means connecting said pressing elements and for guiding said meeting edges into engagement with each other, the grooves of the pressing elements forming together an internal generally tubular longitudinal space into which access is available through the space then existing between the pressing flanges, the portion of said grooves of the pressing elements adjacent the meeting edges forming together a combined smooth pressing surface generally opposite said space through which access may be gained, an elongated form having a thickness such that it can be entered by edgewise movement through said space and having an edge shaped for pressing engagement with said combined smooth pressing surface for pressing a longitudinal strip of a garment sleeved thereon, the remainder of the grooved pressing surfaces and flanges of the pressing elements being shaped so as to be out of contact with said form when said meeting edges of the pressing elements are in contact, means connected to the form for moving said form thus edgewise into pressing engagement with said smooth pressing surface for ironing said longitudinal area of a tubular garment component sleeved on said form, means for then moving the pressing elements pivotally about axes generally longitudinal of said pressing elements and for simultaneously moving them towards each other in a direction to bring the remainder of said grooved surfaces and flanges towards each other and against said form to complete ironing of the remainder of the tubular garment component and for simultaneously rocking those portions of said grooves forming the smooth combined pressing area substantially out of contact with said longitudinal area of the form thereby removing from the form the ironing pressure over said longitudinal area, and a resilient stop for resiliently limiting further edgewise movement of the form when ironing pressure against said longitudinal area is thus released.

17. A pressing machine having a main frame, a pair of presser heads mounted with their pressing surfaces generally directed towards each other and for movement toward and away from each other, a generally elongated hollow buck having a slot longitudinally thereof, a swing frame pivotally mounted on the main frame, said buck being mounted on the swing frame forming a buck and swing frame unit which is movable pivotally about the swing frame pivot from a loading position to a pressing position between said heads, said buck including a wing movable from the interior thereof edgewise through said slot for tensioning a tubular garment member on the buck for pressing, a lever pivoted on the swing frame and extending into the buck for supporting said wing for movement from the interior of the buck edgewise inwardly and outwardly relative to the buck, and retracting means connecting said lever and the main frame for retracting the wing into the buck as the swing frame and the buck move toward loading position, said retracting means comprising a toggle composed of a link of fixed length and an extensible link which is longitudinally extensible from a certain length, said links being pivotally connected to form a toggle that is pivotally connected to said lever and the main frame, said toggle being movable to a straightened position for extending force upon said lever for retracting the wing into the buck as the swing frame and buck move to loading position, and movable to a bent position to extend the wing of said buck, said extensible length being extended as the buck and swing frame move toward pressing position.

18. The apparatus of claim 17 further characterized in that an operator control lever is provided on the swing frame for moving the toggle to the broken position, thereby permitting said lever to move in a direction to move the wing to garment tensioning position.

19. A spatulate buck frame comprising a metal tube, a pair of metal plates having opposite edges, said plates being attached parallel to each other and in substantially spaced, parallel overlying relation, each plate being tangentially attached along one edge to said tube for forming a buck support, the other edge of each plate being free, and steam supply and condensate water return means connected to said tube.

20. The apparatus of claim 19 further characterized in that a buck pad and buck cover are drawn around the tube and said plates, the edges of said pad and covering being attached to and held to the free spaced edges of the overlying plates.

21. The apparatus of claim 20 further characterized in that a metal fastener is attached to the edge of each plate, said fasteners having an edge portion attached to the plate and a flange overlying the portion of the plate adjacent the free edge, said flange having outwardly pertused points upon which the buck pad is snagged for support thereon.

22. A spatulate buck comprising a pair of plates of substantially the same shape having spaced edges, said plates being positioned in spaced overlying relation, said plates having adjacent free edges curved towards each other, a pipe positioned along the opposite edges of said plates, said plates being mechanically attached to said pipe in heat conducting relationship, a buck pad forming an outer covering around said pipe and plates, means for fastening the pad to the curved edges of the plates, and a buck cover of flexible material having a stiffening rod attached thereto along opposite edges, said cover being pulled around said pad and inturned into the space between the plates with the rods positioned in said space and spring tension means adjacent the ends of each plate for engaging the ends of rods for holding them tightly therein to tension said cover.

23. A pressing machine comprising a main frame, a pair of presser heads mounted on the frame with the pressing surfaces of each head generally facing the other, means for moving the heads toward and away from each other, a spatulate form shaped for receiving a tubular garment section, means mounting the form on said frame for movement from a loading position to a pressing position between said heads, first pneumatic means for moving the form from the loading position to the pressing position between said heads, second pneumatic means for moving the heads toward and away from each other, resilient means for retracting the form from the pressing position to the loading position and for moving the presser heads away from each other, an air supply, a safety control valve having an open and a closed position, a manually controlled press closing valve means and air supply lines connecting the air supply to the safety control valve and therethrough to the manually controlled press closing valve means and therethrough to the first pneumatic means, and means operated upon movement of said spatulate form from loading position to pressing position, safety control valve means and automatic time delay valve means connected to said first pneumatic means and to said second pneumatic means for operating said presser heads to pressing position against the spatulate form.

24. A pressing machine comprising a main frame, a pair of presser heads mounted on the frame with the pressing surfaces of each head generally facing the other, means for moving the heads toward and away from each other, a spatulate form shaped for receiving a tubular garment section, means mounting the form on said frame for movement from a loading position to a pressing position between said heads, first pneumatic means for moving the form from the loading position to the pressing position, between said heads, second pneumatic means for moving the heads toward and away from each other, resilient means for retracting the form from the pressing position to the loading position and for moving the presser heads away from each other, an air supply, an air connection including a manually controlled valve for controlling the flow of air to the first pneumatic means for moving the form from the loading position to the pressing position, a timer valve having an operating member connected to said means mounting the form for moving said operating member from a press loading position to press closing position when said means mounting the form moves towards said closed press position, fluid time delay means connected to said operating member for delaying the movement thereof to said press closing position for a time period after the means mounting the form has already moved to said closed press position, and first and second valves operated by said operating member in timed sequence, said first valve being moved first by said operating member and connected in a line from said air supply means to said second pneumatic means for moving the heads to a position to exert ironing pressure against the form after a predetermined time, and the second of said valves being connected to said first and second pneumatic means and after a predetermined further time interval moved for exhausting air from said first and second pneumatic means.

25. The apparatus of claim 24 further characterized in that said second valve is connected to said first pneumatic means for exhausting air therefrom and to said second pneumatic means for then exhausting air from said second pneumatic means.

26. A pressing machine comprising a main frame, a pair of presser heads mounted on the frame with the pressing surfaces of each head generally facing the other, means for moving the heads toward and away from each other, a spatulate form shaped for receiving a tubular garment section, means mounting the form on said frame for movement from a loading position to a pressing position between said heads, first pneumatic means for moving the form from the loading position to the pressing position between said heads, second pneumatic means for moving the heads toward and away from each other, resilient means for retracting the form from the pressing position to the loading position and for moving the presser heads away from each other, an air supply, a time delay valve connected to said means mounting the form on said frame, said time delay valve having a loading position and a pressing position, means for delaying the movement of said time delay valve from its loading position to the pressing position for an adjustable time period after said frame has moved from the loading position to the pressing position, said time delay valve including a first valve means and second valve means operated in timed sequence as it is delayedly moved, a first air operated pilot valve, a line from said air supply having a manually controlled valve therein and connected to said first air operated pilot valve for supplying air from said air supply to said first pneumatic means when the manual control valve is actuated, a second pilot actuated valve connected to the first valve means of the time delay valve so as to be actuated thereby, said second pilot valve being connected to said air supply means and to said second pneumatic means for supplying air to the second pneumatic means when said first valve means of the timer valve is actuated, said second valve means of the time delay valve being connected to the first pilot valve for releasing it so as to exhaust air from the first pneumatic means after a time delay period, and through the time delay valve to said second pilot valve for then through it exhausting air from the second pneumatic means.

27. A pressing machine having an elongated resiliently padded spatulate buck and pair of cooperating smoothly surfaced pressing heads substantially symmetrical about a medial longitudinal plane centrally through said spatulate buck, the cross section of said buck being defined by a generally rounded leading face smoothly joined to side faces generally parallel to said medial plane, said side faces being of relatively greater transverse extent than the leading face of said buck, and a trailing face on said buck narrower than said side faces, and curved to join said side faces, a fin having generally parallel and flat opposite pressing surfaces retractible between said side faces through the central portion of said trailing face, a pair of cooperating presser heads on opposite side of said medial plane, each having an effective pressing area composed of a flange shaped to engage one face of the fin when it is extended and a substantially flat bottomed groove, the bottom of which has a width at least as wide as the corresponding side face of the buck at each position along the buck, the edge of said groove adjacent the flange being a reversely curved surface smoothly joined to the flange and to the bottom of the groove, said surface being curved to fit the curved part of the buck joining the trailing face and the corresponding side face of the buck, the opposite edge of said groove being composed of a curve of greater radius than the radius of the generally rounded leading face of the buck so as gradually to diverge therefrom, said opposite edge of the groove terminating sharply along a straight line edge spaced from the generally rounded leading edge of the spatulate buck and spaced from said medial plane, means for moving the pressing heads in a combined swinging and translating movement to and from a final pressing position in which the flat bottom of the groove and the flange of each one is in pressing engagement with one side face and one face and the fin of the buck and an open position in which the straight line edges of the bucks are in contact and the curved edges of the grooves of said pressing heads are brought together to form a combined curved pressing surface, the bottom of the grooves of the pressing heads in said open position being then diverged from each other and the flanges spaced apart so that the pressing heads together form a hollow tubular pressing surface having a longitudinal slot between said flanges and an interior curved pressing surface adjacent said contacting straight line edges to which access is available through said slot, and means for moving the buck edgewise through the slot until its generally rounded leading edge is in contact with said curved pressing surface and for then moving said heads to final pressing position and simultaneously resiliently urging said buck in a direction to engage the trailing face thereof against the pressing surface of said heads which includes said reversely curved surfaces.

28. The apparatus of claim 27 further characterized in that the bottom of the grooves of the bucks has a width greater than the corresponding side faces of the buck.

29. The apparatus of claim 27 further characterized in that the buck is tapered and the presser heads shaped to correspond to said taper.

References Cited in the file of this patent

UNITED STATES PATENTS

| | | |
|---|---|---|
| 2,479,729 | Davis | Aug. 23, 1949 |
| 2,629,522 | McLagan | Feb. 24, 1953 |